(12) United States Patent
Ostrovsky-Berman et al.

(10) Patent No.: US 9,679,389 B2
(45) Date of Patent: Jun. 13, 2017

(54) METHOD AND SYSTEM FOR BLOOD VESSEL SEGMENTATION AND CLASSIFICATION

(75) Inventors: Yaron Ostrovsky-Berman, Petach-Tikva (IL); Hadar Porat, Tel-Aviv (IL); Tiferet A. Gazit, Tel-Aviv (IL); Oranit Dror, Rishon-LeZion (IL)

(73) Assignee: Algotec Systems Ltd., RaAnana (IL)

( * ) Notice: Subject to any disclaimer, the term of this patent is extended or adjusted under 35 U.S.C. 154(b) by 1281 days.

(21) Appl. No.: 12/781,836

(22) Filed: May 18, 2010

(65) Prior Publication Data

US 2010/0296709 A1    Nov. 25, 2010

Related U.S. Application Data

(60) Provisional application No. 61/179,386, filed on May 19, 2009.

(51) Int. Cl.
  *G06K 9/00*   (2006.01)
  *G06T 7/162*  (2017.01)
  *G06T 7/11*   (2017.01)

(52) U.S. Cl.
  CPC ............ *G06T 7/162* (2017.01); *G06T 7/11* (2017.01); *G06K 2009/00932* (2013.01); *G06T 2207/10072* (2013.01); *G06T 2207/30101* (2013.01)

(58) Field of Classification Search
  CPC ........ G06T 2207/10072; G06T 7/0093; G06K 2009/00932

USPC .......................................................... 382/128
See application file for complete search history.

(56) References Cited

U.S. PATENT DOCUMENTS

| | | | |
|---|---|---|---|
| 7,321,676 B2 | 1/2008 | Lavi et al. | |
| 7,397,937 B2 * | 7/2008 | Schneider et al. | 382/130 |
| 7,953,266 B2 * | 5/2011 | Gulsun et al. | 382/131 |
| 8,229,188 B2 | 7/2012 | Rusko et al. | |
| 8,355,553 B2 | 1/2013 | Fidrich et al. | |
| 8,358,818 B2 | 1/2013 | Miga et al. | |
| 2006/0159342 A1 * | 7/2006 | Sun et al. | 382/173 |
| 2007/0165917 A1 * | 7/2007 | Cao et al. | 382/128 |
| 2008/0187199 A1 * | 8/2008 | Gulsun et al. | 382/131 |
| 2009/0097726 A1 | 4/2009 | Rusko et al. | |
| 2009/0257630 A1 | 10/2009 | Liang et al. | |

OTHER PUBLICATIONS

Farmer "Mutual Imformation for Image Registration and Feature Selection", Michigan State University, Class Notes, CSE-902, 33 P.
(Continued)

*Primary Examiner* — Hiep V Nguyen

(57) ABSTRACT

A method of analyzing structure of a network of vessels in a medical image, comprising:
receiving the medical image depicting the network of vessels;
obtaining a mask of the network of vessels in the image; and generating a non-forest graph mapping a plurality of paths of vessels in the network to directed paths in the graph, with each edge in the graph either directed to indicate a known direction of flow in the corresponding vessel, or undirected to indicate a lack of knowledge of direction of flow in the corresponding vessel, and with all directed edges in a path directed in a same direction as the path.

40 Claims, 11 Drawing Sheets

(56) References Cited

OTHER PUBLICATIONS

Pluim et al. "Mutual-Information-Based Registration of Medical Images: A Survey", IEEE Transactions on Medical Imaging, 22(8): 986-1004, Aug. 2003.

Tourassi et al. "Application of the Mutual Information Criterion for Feature Selection in Computer-Aided Diagnosis", Medical Physics, 28(12): 2394-2402, Dec. 2001.

Zheng et al. "Fast Automatic Heart Chamber Segmentation From 3D CT Data Using Marginal Space Learning and Steerable Features", IEEE 11th International Conference on Computer Vision, ICCV 2007, Rio de Janeiro, Oct. 14-21, 2007.

Zheng et al. "Four-Chamber Heart Modeling and Automatic Segmentation for 3D Cardiac CT Volumes Using Marginal Space Learning and Steerable Features", IEEE Transactions on Medical Imaging, 27(11): 1668-1681, Nov. 2008.

Okada et al. "Automated Segmentation of the Liver From 3D CT Images Using Probabilistic Atlas and Multi-Level Statistical Shape Model", MICCAI 2007, Part I, LNCS 4791: 86-93, 2007.

Schmidt et al. "Fully Automated 3D Segmentation of Liver Tumours Moves A Step Further Towards Clinical Reality", ECR Today, p. 22, Mar. 7, 2009.

Song et al. "Liver Segmentation Using A Model Based Initial Segmentation Estimation", 2 P., 2008. Retreieved From the Internet: http://www.bmva.org/_media/meetings:20081205:yi_song.pdf.

Beucher "The Watershed Transformation Applied to Image Segmentation", Scanning Microscopy, Supplement, p. 1-26, 1992.

Manniesing et al. "Vessel Enhancing Diffusion. A Scale Space Representation of Vessel Structures", Medical Image Analysis, 10" 815-825, 2006.

Sethian "Fast Marching Methods", SIAM Review, 41(2): 199-235, 1999.

Szymczak et al. "Coronary Vessel Cores From 3D Imagery: A Topological Approach", Medical Image Analysis, 10(4): 548-559, Aug. 2006.

Official Action Dated Aug. 30, 2013 From the US Patent and Trademark Office Re. U.S. Appl. No. 12/868,770.

Official Action Dated Apr. 21, 2014 From the US Patent and Trademark Office Re. U.S. Appl. No. 12/868,770.

\* cited by examiner

METHOD AND SYSTEM FOR BLOOD VESSEL SEGMENTATION AND CLASSIFICATION

RELATED APPLICATIONS

This application claims benefit under 35 USC 119(e) of U.S. Provisional Patent Application No. 61/179,386 filed on May 19, 2009. The contents of that application are incorporated by reference as if fully set forth herein.

FIELD AND BACKGROUND OF THE INVENTION

The present invention, in some embodiments thereof, relates to medical imaging segmentation and, more particularly, but not exclusively, to segmentation of blood vessels and blood vessel networks in medical imaging applications.

Medical images are images of a human subject that are analyzed for the purposes of biological and medical research, diagnosing and treating disease, injury and birth defects. Commonly, medical images involve modalities that are designed for capturing data for imaging internal organs and tissues in a non-invasive manner. Examples of such modalities include computed tomography (CT), magnetic resonance imaging (MRI), positron emission tomography (PET), ultrasound, fluoroscopy, conventional x-rays, and the like. Medical images may be analogue or digital, two-dimensional or three-dimensional; however, three-dimensional modalities are digital.

When medical images are taken for diagnosis they are usually meticulously inspected by computer aided diagnosis (CAD) systems and/or trained medical practitioners, for example radiologists, to detect instances of abnormality that may be indicative of diseases. Additionally, the medical images may be used to accurately locate lesions so that treatments such as chemotherapy and radiotherapy may be precisely delivered and surgery may be effectively planned.

As medical images are usually three or four dimensional, the practitioner may step through a sequence of two-dimensional image slices at regular intervals, inspecting each slice. Thus, inspection of medical images may be tedious and prone to error. Accordingly, methods of computer aided detection (CAD) have been developed for the automatic location, registration, and segmentation. CAD may also be used for locating, characterizing, segmenting and diagnosing anatomical structures.

One of the tools that assist the practitioner is blood vessel segmentation. This tool may be used for facilitating diagnosis of vascular diseases, surgery planning, blood flow simulation, and the like. For example, published US patent application 2007/0031019, published in February 2008, describes a method for segmenting coronary vessels in digitized cardiac images that includes providing a digitized cardiac image, providing a seed point in the image, selecting a volume-of interest about the seed point, performing a local segmentation in the volume-of-interest, including initializing a connected component with the seed point and a threshold intensity value to the intensity of the seed point, adding a point to the connected component if the point is adjacent to the connected component and if the intensity of the point is greater than or equal to the threshold value, lowering the threshold intensity value, and computing an attribute value of the connected component, wherein if a discontinuity in the attribute value is detected, the local segmentation is terminated, wherein a local segmentation mask of a vessel is obtained.

A. Szymczaka, A. Stillman, A. Tannenbaum, and K. Mischaikow, "Coronary vessel tree from 3D imagery: A topological approach," *Medical Image Analysis* Vol. 10(4), p. 548-559, 2006, describes a method of reconstructing vascular trees, including coronary trees, from three-dimensional medical images. Geometric filters are applied to remove spurious branches and fill in gaps in the vascular tree.

Published US patent application 2007/0165917, "Fully Automatic Vessel Tree Segmentation," to Cao et al, describes an automatic vessel tree extraction module, that forms a vessel tree from a three-dimensional reconstructed image. The module computes characteristic paths for the vessels, discards some components and connects some components, to form the vessel tree.

Published US patent application 2008/0187199, "Robust Vessel Tree Modeling," to Gulsun et al, describes a method of segmenting and modeling vascular structures from contrast enhanced cardiac CT and MRI images. A local centerline representation of vessels, including a full vessel tree, is constructed by a minimum-cost path detection algorithm, using a vesselness filter technique. In this algorithm, a seed voxel is chosen. To find a centerline path, a voxel is selected that has a largest distance to the seed voxel, and a path is found by backtracking until either the seed is reached, or a previously found path is reached.

SUMMARY OF THE INVENTION

According to an aspect of some embodiments of the present invention there is provided a method for analyzing the structure of a network of vessels, for example blood vessels, in a medical image. The method comprises receiving a medical image depicting a network of vessels, obtaining a mask of the vessels, and generating a graph, mapping a plurality of paths in the network. The graph is a mixed graph, which means that each edge in the graph can be either directed or undirected. Directed edges indicate the direction of flow in the corresponding vessel in the image, and undirected edges are used when there is uncertainty as to the direction of flow, due to using a network of vessels which is really or apparently not simply connected. The method of generating the graph allows the graph to include undirected cycles, which may be defined as arrangements of edges and nodes which would constitute simple graph cycles if all the directed edges in the graph were changed into undirected edges. Such undirected cycles may be useful to include, because the network of coronary arteries may be not simply connected if the patient has a coronary bypass, for example. Even if the network of vessels is simply connected, it may appear to be not simply connected due to artifacts in the image or other errors in masking the vessel network, so it may be useful to include undirected cycles in the graph, to avoid making an irreversible wrong guess as to which path in the network is in error. Optionally, the method also includes selecting paths in the graph that are believed to correspond to real paths of flow in the network, and using the selected paths to identify known vessels in the image by name.

There is thus provided, in accordance with an exemplary embodiment of the invention, a method of analyzing structure of a network of vessels in a medical image, comprising:

receiving the medical image depicting the network of vessels; and generating a non-forest graph mapping a plurality of paths of vessels in the network to directed paths in the graph, with each edge in the graph either directed to indicate a known direction of flow in the corresponding vessel, or undirected to indicate a lack of knowledge of direction of flow in the corresponding vessel, and with all directed edges in a path directed in a same direction as the path.

Optionally, the method also comprises obtaining a mask of the network of vessels in the image, before generating the non-forest graph, wherein generating the non-forest graph comprises using the mask.

There is further provided, in accordance with an exemplary embodiment of the invention, a method of analyzing structure of a network of vessels in a medical image, comprising:

receiving the medical image depicting the network of vessels;

obtaining a mask of the network of vessels in the image; and generating a non-forest graph mapping a plurality of paths of vessels in the network to directed paths in the graph, with each edge in the graph either directed to indicate a known direction of flow in the corresponding vessel, or undirected to indicate a lack of knowledge of direction of flow in the corresponding vessel, and with all directed edges in a path directed in a same direction as the path.

Optionally, obtaining a mask comprises identifying at least one seed voxel in the medical image and expanding each seed voxel to a plurality of neighboring voxels in the medical image.

Optionally, said expanding is performed according to at least one voxel property of said plurality of neighboring voxels.

Optionally, said at least one voxel property comprises a member of a group consisting of: a local intensity, an intensity of surrounding voxels, and a geometric shape of a cluster of voxels.

Optionally, said expanding at each voxel reached is performed according to at least one voxel risk score that changes from one voxel to a next voxel on each path taken by the expansion, the risk score increasing when a local cost function is positive, and decreasing when the local cost function is negative, but not decreasing below a minimum value, the expansion on that path stopping when the risk score reaches a maximum value.

Optionally, obtaining a mask comprises identifying a plurality of seeds and selecting said at least one seed according to a location in the medical image.

Optionally, the method further comprises excluding at least one of said plurality of seeds according to connectivity thereof via a group of selected voxels to another of said plurality of seeds or to a set of voxels identified as belonging to a particular organ or tissue.

Optionally, obtaining a mask further comprises selecting said at least one seed from a plurality of voxels having a property indicative of an artery according to a connectivity thereof via a group of selected voxels, while excluding at least one voxel having a property indicative of at least one of a vein and a lung vessel.

Optionally, the at least one seed voxel comprises a plurality of seed voxels and obtaining a mask further comprises connecting each said expanded seed voxel to another said expanded seed if said expanding passes via adjacent voxels.

In an exemplary embodiment of the invention, generating a graph comprises identifying a root voxel in the image and growing a region of vessel voxels from the root voxel, and determining a meeting point where two fronts of the growing region, coming from two different directions, meet in the image.

Optionally, the root voxel is in the mask, and growing the region of vessel voxels is confined to the mask.

Optionally, determining a meeting point comprises assigning a succession of representative voxels and their corresponding local volumes of influence, for a plurality of portions of the growing front, and determining when a point on the front has a succession of representative voxels extending in two different directions.

Optionally, generating the graph comprises tracing two paths in the image back from the meeting point toward the root voxel, the two paths being traced along vessels in the mask respectively in the two different directions that the fronts came from, the tracing back of each path ending when reaching the root voxel, or when reaching another path, the root voxel and voxels where paths meet other paths in the image corresponding to nodes in the graph, and portions of paths between such voxels corresponding to edges in the graph.

Optionally, generating the graph also comprises tracking one or more paths in the image back from a termination point to the root voxel, each path going along at least one vessel in the mask, the tracing back of each path ending when reaching the root voxel, or when reaching another path.

Optionally, the method also comprises outputting a skeleton of the network comprising a set of voxels that the traced back paths traverse.

In an embodiment of the invention, generating the graph also comprises assigning a direction to each edge for which the corresponding path portion in the image does not include a meeting point, but making undirected any edge for which the corresponding path portion in the image includes a meeting point.

Optionally, tracing back the path comprises using a gradient descent method.

In an embodiment of the invention, the method also comprises selecting at least one of the paths in the graph according to at least one path property of said path in the graph or of the corresponding path in the image.

Optionally, selecting at least one of the paths comprises selecting no more than one of a pair of paths that take different routes between a same pair of nodes, for at least one pair of such paths in the graph.

Optionally, said at least one path property is a member of a group consisting of length, intensity pattern, local path directionality, and geometry of a vessel that the path goes along.

Optionally, the method also comprises classifying at least one vessel that at least a portion of one of the selected paths goes along.

Optionally, the network comprises a network of coronary arteries, and the classified vessels comprise a member of a group consisting of the left anterior descending artery (LAD), the left circumflex artery (LCX), and the right coronary artery (RCA).

Optionally, the network comprises a network of liver blood vessels, and the classified vessels comprise a member of a group consisting of the hepatic arteries, the hepatic veins, and the portal veins.

Optionally, classifying comprises using properties of the graph.

Optionally, classifying comprises using a vessel tracking algorithm.

Optionally, classifying comprises using a member of a group consisting of a Euclidean length of at least a portion of the selected path that goes along the vessel, an intensity pattern of said path, an estimated caliber of the vessel, and directionality of at least a portion of said path.

Optionally, the network of vessels is a first network of vessels, associated with a second network of vessels in the same image, the method further comprises obtaining a mask of the second network of vessels, and selecting comprises looking for matches between at least a portion of one or more paths in the image corresponding to an edges in the graph, and portions of the mask of the second network, and excluding at least one of those paths from selection in the graph.

Optionally, the method also comprises generating a second graph mapping a plurality of the vessels in the second network using the mask of the second network, and looking for matches comprises looking for matches between at least portions of paths in the image corresponding to an edge in the first graph and an edge in the second graph.

Optionally, the method also comprises classifying said matched portions as belonging to either the first network, the second network, or neither of them, and excluding comprises excluding a path for which said matched portion is classified as not belonging to the first network.

Optionally, the first network comprises a network of arteries and the second network comprises a network of veins.

Optionally, obtaining a mask comprises identifying a plurality of seed voxels and growing each seed voxel to generate a plurality of disconnected vessel masks, generating a non-forest graph comprises generating a plurality of disconnected graphs each mapping at least one path in a different one of said plurality vessel masks, and the method also comprises using the plurality of graphs to find a path in the image that connects the paths mapped by two of the plurality of disconnected graphs.

Optionally, the image represents the heart and a portion of at least one of a ribcage, a liver, a spine, and lungs, and the mask is a mask of blood vessels.

Optionally, identifying the seed voxel further comprises mapping an aorta segment, identifying one or more aorta seeds in the aorta, and separately expanding said one or more aorta seeds to a plurality of connected voxels in said medical image.

Optionally the mapping is performed by identifying a fit of a shape template in said medical image and identifying the orientation of at least one of the longitudinal axis and the aorta valve in said medical image.

Optionally, generating the graph further comprises detecting and filtering nodes in the graph according to an orientation of a corresponding junction of vessels in the medical image.

There is further provided, in accordance with an exemplary embodiment of the invention, apparatus for analyzing structure of a network of vessels in a medical image, comprising:

an input interface configured for receiving a medical image depicting a network of vessels;

a mask calculating module configure to find a mask of the network of vessels in the image; and a graph generating module configured to generate a non-forest graph mapping a plurality of paths of vessels in the network to directed paths in the graph, with each edge in the graph either directed to indicate a known direction of flow in the corresponding vessel, or undirected to indicate a lack of knowledge of direction of flow in the corresponding vessel, and with all directed edges in a path directed in a same direction as the path.

Optionally, the apparatus also comprises a path selecting module configured to select at least one of the paths in the graph according to at least one path property of said path in the graph or of the corresponding path in the image.

Optionally, the apparatus also comprises a classifying module configured to classify at least one vessel that at least a portion of one of the selected paths goes along.

Optionally, the input interface is configured for receiving said medical image from a picture archiving and communication system (PACS).

There is further provided, in accordance with an exemplary embodiment of the invention, a method of obtaining a segmentation mask for a medical image, the method comprising:

identifying at least one seed voxel in the medical image; and expanding each seed voxel to a plurality of neighboring voxels in the medical image, wherein said expanding at each voxel reached is performed according to at least one voxel risk score that changes from one voxel to a next voxel on each path taken by the expansion, the risk score increasing when a local cost function is positive, and decreasing when the local cost function is negative, but not decreasing below a minimum value, the expansion on that path stopping when the risk score reaches a maximum value.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1:
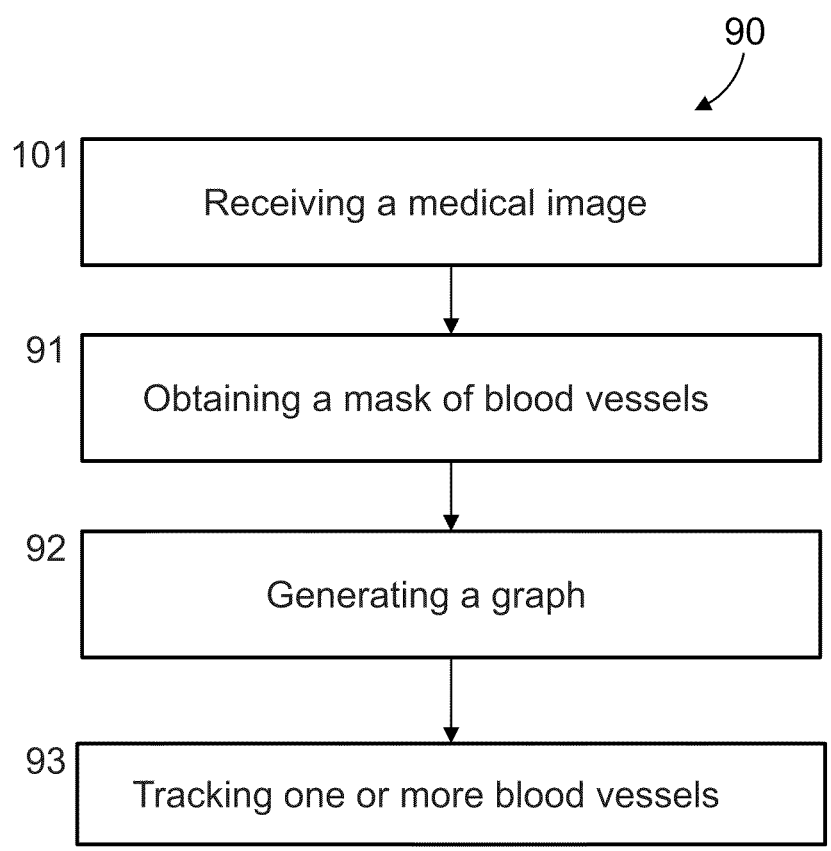
FIG. 1 is a flowchart for a method for analyzing the structure of a network of vessels, such as blood vessels, in a medical image, according to some embodiments of the present invention.

The present invention, in some embodiments thereof, relates to medical imaging segmentation and, more particularly, but not exclusively, to segmentation of blood vessels and networks of blood vessels in medical imaging applications.

According to some embodiments of the present invention there is provided a method for analyzing the structure of networks of blood vessels, such as the coronary arteries, the hepatic artery tree, hepatic vein tree, portal vein, and/or portal vein branches, in a medical image, such as a CT-angiography study, for example a CT study of the heart during a selected phase representing a predetermined period of a beat of the heart. The method is based on analyzing the topology of the network in order to find one or more target blood vessels in a selected network of blood vessels using a graph that maps a plurality of paths in the network. The graph, which may have both directed and undirected edges to represent knowledge about the direction of flow in the vessels, is generated with an algorithm that allows it to have one or more undirected cycles, rather than being limited to forests of one or more trees, which are graphs that have no undirected cycles. As used herein, a tree graph is a special case of a forest graph, and a non-forest graph means a graph with at least one undirected cycle. An undirected cycle is defined here as a set of nodes and edges that would form a simple cycle in the corresponding undirected graph, where all directed edges, if there are any, have been replaced by undirected edges. A simple cycle is one that does not include the same edge more than once. In some embodiments of the invention, at least one undirected cycle in the graph does not include two edges that go between the same two nodes. The method allows segmenting, identifying and/or classifying vessels in the network, such as the left anterior descending artery (LAD), the left circumflex artery (LCX), and/or the right coronary artery (RCA), in the case of a coronary artery network. The graph allows excluding artifacts and non targeted vessels from the segmentation of the targeted vessels.

Using a graph that has undirected cycles, or is allowed to have undirected cycles, has the potential advantage that the resulting segmentation may be more accurate, particularly in a case where the image is relatively noisy or low in resolution. Images from three-dimensional medical imaging modalities are often relatively noisy and low resolution, with only marginally sufficient signal to noise ratio and resolution to enable identification of blood vessels, because increasing the resolution or the signal to noise ratio generally increases the radiation dose in the case of CT images, and/or increases the imaging time, in the case of MRI for example. If the graph is assumed to be a tree at the outset, and undirected cycles are avoided when the graph is generated, then there is a good chance that the chosen path between two points in a coronary artery tree, for example, will cross over to a coronary vein and back, or will cross over to another nearby blood vessel, such as a lung blood vessel, or to another object of similar density. By allowing the graph to include undirected cycles, all plausible paths between two points can be kept, and the correct path can be chosen later by a user, or by using a non-local characteristic of the paths, such as their total length. Furthermore, in a patient with a coronary bypass, there is a real undirected cycle in the coronary arteries, which cannot be found if the graph is assumed to be a tree.

The method is facilitated by using a method for generating the graph that is robust, giving consistent results that are not very sensitive to details of the noise, even when the image is relatively noisy, and generating a graph that includes the correct paths, without also including too many false paths. The method is also facilitated by using a method to eliminate false paths that is effective and relatively rapid. Useful features for such methods of generating the graph, and eliminating false paths, are described below.

Optionally, a user interacts with a computer running the software, in order to select a correct path or paths connecting any two points, while excluding false paths from consideration, for example when identifying blood vessels by name. If too many false paths were considered as selected paths, and/or if the software could not exclude many of these from consideration automatically, then it might be too difficult or time-consuming for the user to pick the correct path or paths. Optionally, the software uses a graphical user interface such as that described in provisional U.S. patent application No. 61/264,676, filed on Nov. 26, 2009, to allow a user to select the correct paths. Having an effective graphical user interface may facilitate the method by allowing a user to select a correct path from a relatively large number of false paths, potentially allowing the algorithm to work when the image has more noise or lower resolution than if a less effective user interface were used.

Optionally, the graph is generated based on a blood vessel mask that depicts the network of blood vessels, for example the coronary arteries. The blood vessel mask is optionally generated by identifying one or more seeds, including, for example, one or more central voxels in the aorta and/or one or more voxels on a boundary of the aorta, and using a fast marching algorithm for expanding the seeds, according to properties of voxels, to a single blood vessel mask. Undirected cycles are optionally generated in the graph when two fronts expanded from one seed reach adjacent voxels, and their corresponding routes are joined together in the graph.

The term "mask" in the literature of medical imaging and segmentation usually means a binary mask, in which every voxel is either part of the mask, representing a particular organ or type of tissue in the image, or not. But the methods described herein can also be performed using a "fuzzy mask," in which each voxel in the image has a certain probability of being in the mask, rather than being definitely in or out. The term "mask" as used herein, and in the claims, includes such a fuzzy mask. In such an embodiment of the invention, the probability of a voxel being in the mask could depend, for example, on the path-cost integral up to that voxel, but the fast marching algorithm used to obtain the mask could be extended to all voxels in the image, or at least to many more voxels than would be included in a binary mask. Procedures that are limited to voxels in a binary mask, such as the procedures used for generating a graph in FIG. 5, and other procedures described in FIGS. 6-10, could instead be open to all voxels in the image with a non-zero probability of being in the mask, but with the probability of being in the mask taken into account in the procedure, similar to the way the local cost and the distance transform are taken into account when using a binary mask, as described below. Using a binary mask has the major potential advantage that computation time is greatly reduced, if only a small fraction of the voxels are in the mask. With high resolution and large field of view of modern medical imaging technology, an image could easily have $10^8$ or more voxels, and the need to take all of them into account when analyzing the image could result in very long processing times even on modern computers. But it is possible that in the future, as computation speeds increase, limits on computation speed will no longer be so important, while resolution of medical images may be limited by physical constraints, such as safety of x-ray doses, and may not increase so much in the future. Using a fuzzy mask has the potential advantage that no voxels, or fewer voxels, are irreversibly excluded as candidates for being part of the organ or tissue in the mask, and this may result in smoother and more accurate analysis of the image.

The blood vessel mask is optionally adjusted using the graph and a portion thereof that depicts artifacts and/or untargeted blood vessels, for example coronary veins, which are located in proximity to the coronary arteries. Alternatively, only the graph is adjusted. Optionally, an additional blood vessel mask or a graph of untargeted vessels is used for adjusting the segmentation of the blood vessel mask and/or adjusting the graph. For example, a graph mapping paths of arteries and the additional graph mapping paths of veins are matched in order to filter out paths and/or graph edges that are more likely to be veins than arteries, or vice versa.

When the blood vessel mask or graph is adjusted, one or more paths are optionally excluded from consideration as selected paths in the graph, or other paths are preferentially selected over those paths. Optionally this is the only adjustment made, and no portion of the mask or graph is actually deleted. Alternatively, edges are removed from the graph, and corresponding parts of the mask may be removed. Paths may be excluded to avoid having undirected cycles in the selected paths, particularly if there is at least one selected path in the graph that connects the beginning and end of the path that is excluded. Paths may also be excluded from consideration as selected paths, in order to disconnect one or more nodes from the graph completely, for example if the graph represents an artery tree and the disconnected nodes are believed to correspond to veins, or arteries from a different tree, or image artifacts. Optionally, paths are selected while other paths are excluded according to one or more path properties, for example length, intensity pattern, local path directionality, and geometry of the corresponding vessel in the image. Optionally one or more nodes are excluded from consideration as nodes for selected paths to pass through, according to an orientation of a corresponding vessel in the image.

Optionally, the graph is used for classifying the vessels in the network as known named vessels.

It should be noted that, although the direction of directed edges is used to indicate knowledge about the direction of blood flow in the vessels, the direction of the directed edges need not be the same as the direction of the blood flow. Rather, the direction of the directed edges should have a consistent relation with the direction of blood flow, within a graph generated to represent a given network of vessels, for example a network of coronary arteries, or a network of coronary veins. In the usual convention used for graphs representing branching blood vessels, the direction of the directed edges is outward from a root node, representing the largest blood vessel in the network, toward the terminal nodes, representing the smallest blood vessels. With this convention, which is adopted for the description of the methods herein, the direction of directed edges would be the same as the direction of blood flow for artery networks, and opposite to the direction of blood flow for vein networks. One could also adopt the opposite convention for the direction of directed edges relative to the root node, as long as the convention adopted is consistent.

An aspect of some embodiments of the invention concerns a method of segmenting a medical image, in which one or more seed voxels are chosen and are expanded. The local expansion depends, at least in part, on a risk score calculated for each voxel encountered by the expanding front, which depends on the past history of the expansion, and in particular may depend on the value of a local cost function at each of the voxels in an expansion path leading to the voxel whose risk is being calculated. The risk score for a given voxel depends on the risk score for the last voxel encountered on that path during the expansion, but may be higher or lower, depending on the value of the local cost function. However, there is a minimum value below which the risk score cannot fall. If the path has followed voxels with relatively low local cost for a long enough distance, then the risk score will be at the minimum value, and any earlier contribution of high local cost function voxels will be forgotten. If the expansion path goes past voxels with relatively high local cost for a great enough distance, then the risk score will rise, and the expansion on that path will stop when the risk reaches a maximum allowed value. The risk score may be characterized as a measure of the integrated local cost encountered recently by the expansion path in relatively high local cost regions, but losing memory of any past region of high local cost, after it has traversed a sufficiently long region of relatively low local cost.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIG. 1, which is a flowchart 90 for a method for analyzing the structure of blood vessels, such as the coronary arteries, in a medical image, for example as defined below, according to some embodiments of the present invention. As used herein, analyzing the structure of blood vessels means segmenting, mapping, marking, cropping, and/or any other operation of separating blood vessels from a medical image, determining their skeleton in the image and/or their topology, and/or identifying them as named blood vessels. The method of flowchart 90 may be used for analyzing a set of vessels, such as arteries and/or veins in organs, in the medical image. For example, in addition to major coronary arteries such as the LAD, LCX, and RCA mentioned above, minor coronary arteries such as the diagonal, lateral, conic, acute marginal, and/or the posterior descending arteries, may be analyzed in a medical image imaging the heart. In another example, the hepatic artery and/or the portal vein may be analyzed from a medical image depicting the area of the liver. The analysis may include mapping the centerlines of the vessels.

First, as shown at 101, a medical image that depicts a network or plexus of blood vessels is received. "Network," as used in this application, and "plexus," as used in provisional U.S. patent application 61/179,386, have the same meaning, and both refer to a set of interconnected vessels, such as blood vessels. It should be understood that wherever "blood vessels" are mentioned herein, other types of interconnected vessels that form networks, such as lymph vessels, may also be used, unless it is clear from context that only blood vessels are meant. As used herein, a medical image means a medical imaging object, such as a computed tomography (CT) scan object, a PET/CT scan object, a DICOM object, and/or any other medical image. Optionally, the medical image depicts an organ during a defined phase, for example a scan of the heart during a certain period the heart beat. In this description, the medical image is an exemplary CT scan of the heart area in a selected phase. Such a medical image includes approximately 300 slices. It should be noted that any other medical scan may also be processed as described herein.

At 91, a mask of blood vessels in the image is obtained, either by calculating it as will be described in more detail below, or by loading a previously calculated mask into a memory a computer or other device that is analyzing the image according to the method of flowchart 90. At 92, a graph mapping a plurality of paths in the network of blood vessels is generated. At 93, the paths, which are optionally at least partly overlapping, are used for tracking one or more target blood vessels of the depicted network. The graph, which is optionally generated as described below, describes the topology of the blood vessels of the network. Furthermore, the graph allows scoring the correspondence of a number of mapped paths to the targeted vessels according to their properties. For example, a path may be scored according to the intensity of its voxels, the intensity of voxels which are located in proximity thereto, the uniformity of the voxels' intensity along the path, and/or the resemblance of the geometric arrangement of the voxels to target blood vessels, such as arteries or veins. Such scoring allows excluding artifacts and/or untargeted vessels from the segmentation. For example, if the target blood vessels are the coronary arteries and the medical image is a CT study, the graph may be used for excluding coronary veins and/or CT artifacts, such as physics-based, patient-based, scanner-based, and/or helical and multisection technique artifacts, or for preferentially selecting paths in the network that do not contain veins, or such artifacts. An exemplary graph generation process and the usage thereof for adjusting the segmentation of target vessels are provided below.

Figure 2:
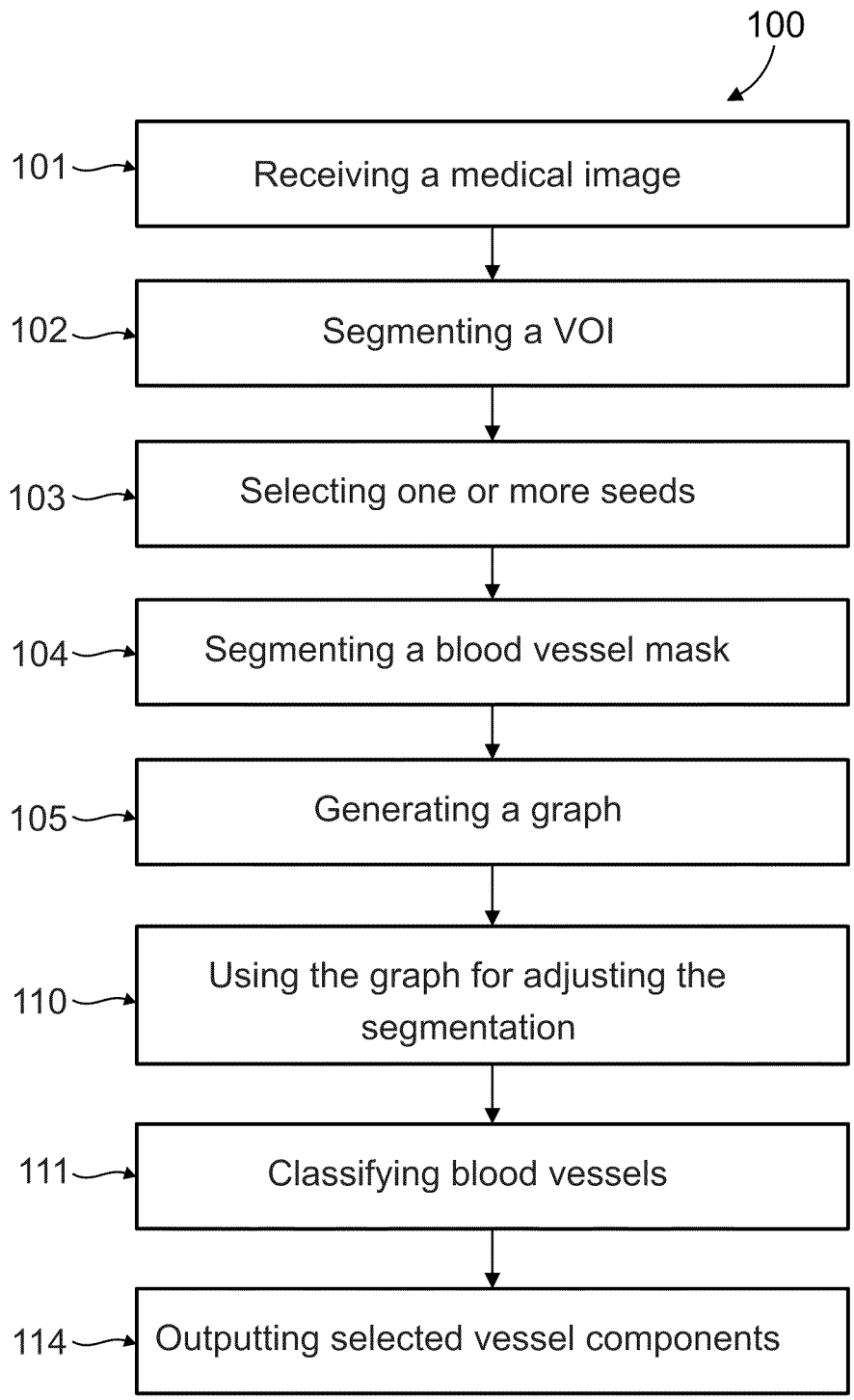
FIG. 2 is a flowchart of a method for classifying blood vessels using a graph mapping a plurality of blood vessel paths, and optionally identifying a centerline that passes therethrough, according to some embodiments of the present invention.

Reference is now made to FIG. 2, which is a flowchart 100 of a method for segmenting, and tracking, one or more blood vessels in a medical image using a graph mapping a plurality of blood vessel paths, according to some embodiments of the present invention. Block 101 is as depicted in FIG. 1, however, FIG. 2 further depicts sub processes performed for graph generation and for segmentation, for example as outlined above in relation to 92 and 93 of FIG. 1. Additional blocks pertaining to classification 111 and selection of paths 110 are also depicted. Selection of paths is sometimes referred to herein, and in provisional U.S. patent application 61/179,386, as "segmentation adjustment," "adjustment of the blood vessel mask," "adjustment of the graph," "adjustment of the root component of the blood vessel mask," and similar terms, because it may include designating certain edges of the graph, and the corresponding path portions in the image, as excluded from selection as valid paths in the blood vessel network. In some embodiments of the invention, such edges may be removed from the graph, and/or the corresponding voxels in the image may be removed from the skeleton of the network, which is a map of the graph in the image. Voxels may also be removed from the mask in some embodiments of the invention.

First, similarly to what is described above for flowchart 90, a medical image is received at 101. Optionally, at 102, a volume of interest (VOI) is mapped or segmented from the received medical image. Optionally, as described above, the medical image depicts an area of the heart. In such an embodiment, the heart is segmented from the ribcage, the lungs, the spine, and/or the liver, and/or other adjacent structures such as large blood vessels entering the heart, for example as described in U.S. Patent Application Pub. No. 2007/0081702 published on Apr. 12, 2007, which is incorporated herein by reference.

Now, at 103, one or more vessel seeds are identified in the segmented VOI. Each vessel seed may be used as a starting point from which one or more blood vessels are grown, optionally using a marching algorithm, for example as described below. Optionally, if the segmented VOI depicts the heart, one or more voxels located in a region in the aorta are identified as seeds. Optionally, seeds may also be chosen from voxels in more distal parts of the coronary artery network, to make sure that these more distal regions are not missed when the seeds in the region of the aorta are grown, and these distal components of the blood vessel mask may later be connected to the main component, for example as described below in FIG. 8.

Figure 3:
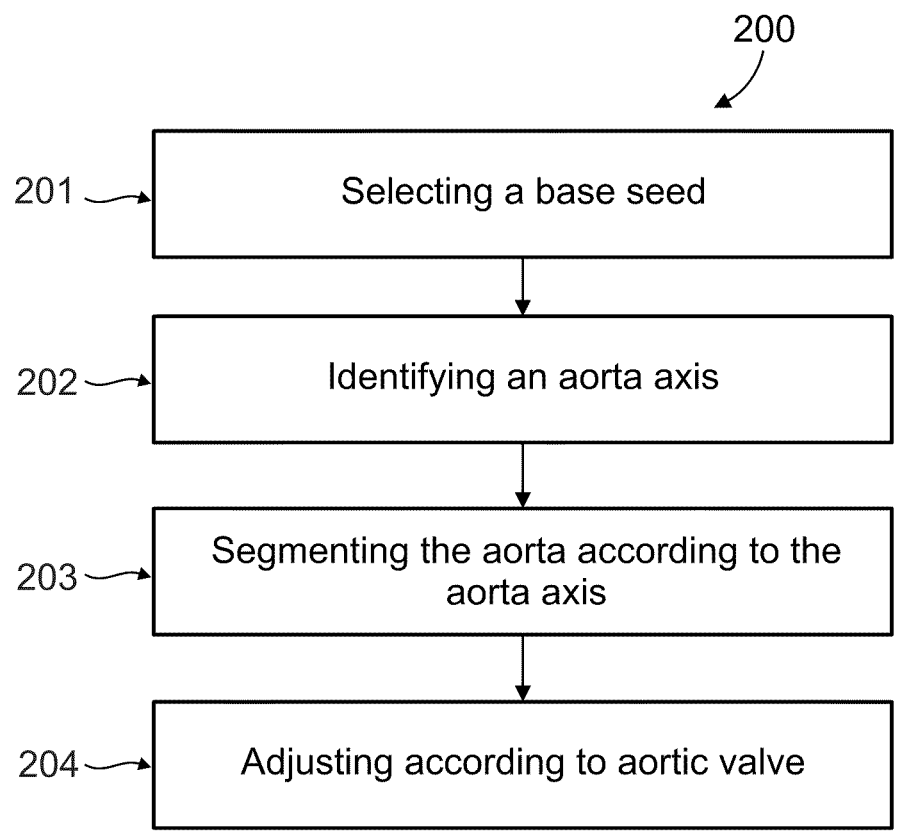
FIG. 3 is a flowchart of a process for segmenting the aorta, according to some embodiments of the present invention.

Reference is now also made to FIG. 3, which shows a flowchart 200 of a process for segmenting the aorta, according to some embodiments of the present invention. First, at 201, an aorta base seed is identified. Optionally, identification of the aorta base seed is based on the output of the aforementioned process of segmenting the heart from adjacent structures, including the aorta. Now, at 202, the longitudinal axis of the aorta is identified. Optionally, a search, such as an exhaustive search, also known as a brute-force search, is performed for identifying the best fit of a shape template around the ascending aorta area. The shape template optionally consists of three concentric skewed cylindrical annuli. The innermost cylinder is sized and shaped to confine the aorta, the outermost cylinder is sized and shaped to confine, by its surface, the tissues surrounding the aorta, and the middle cylinder is sized and shaped to confine portions of both. The best fit is identified by ranking the correspondence of the shape template to various areas in the VOI. Optionally, the ranking is based on a fitness score that is based on an intensity average and on a standard deviation within each cylinder. In the inner cylinder, a high score may be given for low variance and high intensity values. In the outer cylinder, a high score may be given for low intensity. The scoring is performed on the base of the cylinders, and/or on the skew angle. For example, a search may be performed in three degrees of freedom—the x,y location and the axis direction angle. The cylinders may move as a whole in the x and y axes and at each location several directions around a preferred fixed direction are probed. A score based on the values of the image inside each region described by the cylinders is calculated for each direction. The best fit is indicative of the longitudinal axis of the aorta.

Now, at 203, the area around the longitudinal axis is optionally disconnected from nearby high intensity structures which are indicative of cardiac chambers and pulmonary trunks. This disconnection is performed, for example, by morphological opening and connectivity operations which are carried around the longitudinal axis. The thresholds of these operations are optionally selected according to the values of the voxels bounded in the inner and outer cylinders. For example, the Hounsfield values of voxels depicting the aorta and/or its surroundings are typically contrasted. For example, typical HF values for the enhanced aorta are 200 HU and above and typical values for the surrounding tissues are 50 HU and below. The actual values are optionally learned from the cylindrical model. The threshold for separating the aorta from the surrounding tissue is taken, for example, as the 20th percentile of the grayscale histogram inside the inner cylinder.

Morphology may be used for disconnecting these voxels from other organs adjacent to the aorta. The aorta may be connected to the surrounding blood-filled structures (pulmonary vessels and cardiac chambers) through the valves and/or thin bridge connections created by modality artifacts and/or insufficient resolution separation. Opening operations may be used to remove these bridge connections, while at block 204 the segmentation defines the aorta to end at the aortic valve. In such a manner, the aorta's cylindrical shape may be maintained and noise may be reduced or eliminated.

Now, at 204, the segmentation is adjusted according to the position of the aortic valve. Optionally, a slice-wise analysis of the segmentation along the aorta's longitudinal axis is performed and the aortic valve that separates the aorta from the left chamber is identified. This allows separating the left chamber from the aorta. Such a separation is based on the change in the cross sectional area and the circularity measure of the aorta segment. The cross section with the sharpest increase in area and decrease in circularity signifies the blood below the aortic valve, inside the left ventricle.

The segmentation may be performed as a cut-off from below at the level of the valve and from above at the level of the aortic arch, where the aorta arches away from the longitudinal axis and turns downward.

Reference is now made, once again, to FIG. 2. After a base seed and any additional seeds have been identified, as will be described below in FIG. 4, the VOI is analyzed to allow the mapping and/or segmentation of a single blood vessel mask that is indicative of a network of blood vessels, at 104. For example, if the received medical image describes the heart, the blood vessel mask may depict the coronary arteries.

Figure 4:
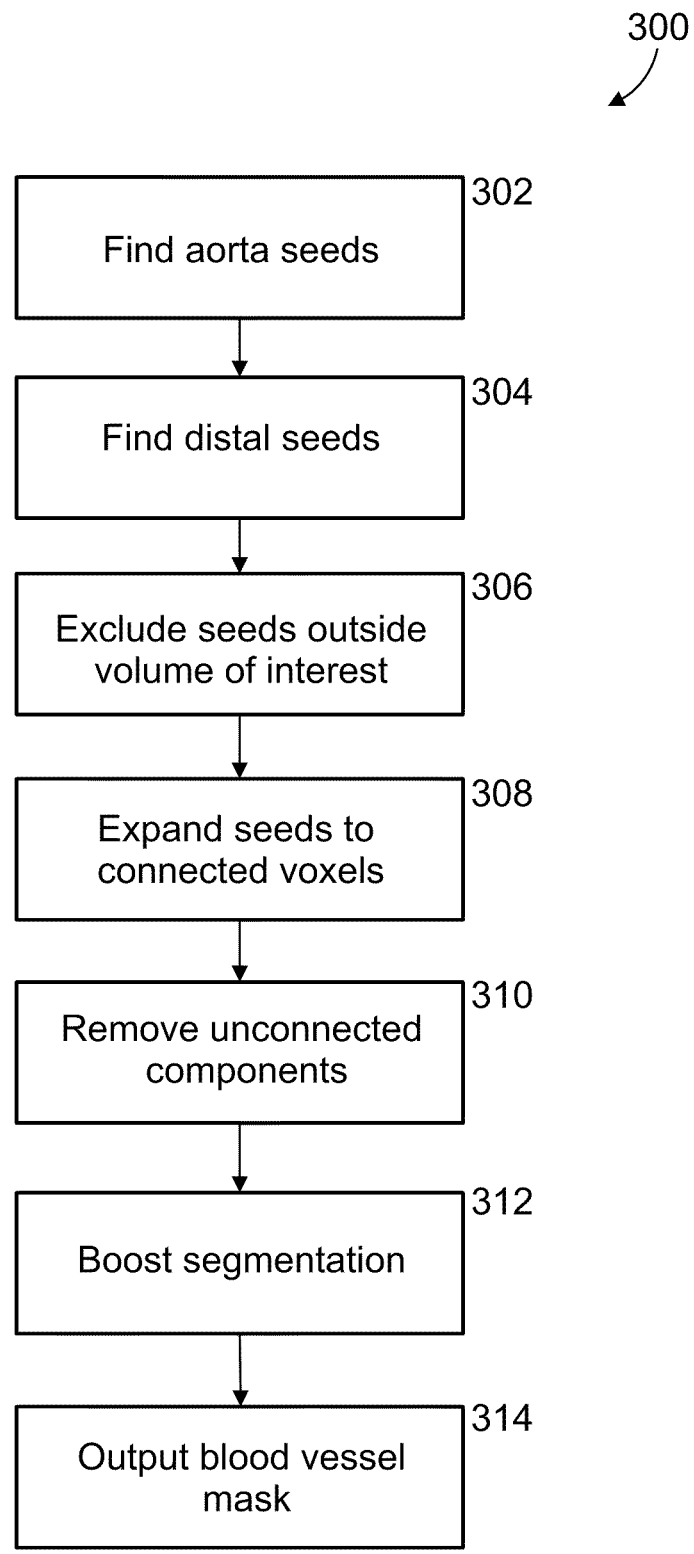
FIG. 4 is a flowchart of a process for obtaining a blood vessel mask by expanding each one of the seeds, according to some embodiments of the present invention.

FIG. 4 shows a flowchart 300 for a method of identifying a blood vessel mask by expanding each one of the seeds, according to some embodiments of the present invention. The blood vessel mask depicts a network of connected blood vessels which are imaged in the VOI, for example coronary arteries. At 302, one or more additional cardiac seeds may be identified and marked on the surface of the aorta segment. Optionally, these seeds are voxels on a cluster of voxels that is indicative of the outer boundary of the aorta. For example, the boundary of the aorta is dilated by some width, such as 2 mm, and voxels within that dilated boundary, having at least a minimum Hounsfield (HU) value of intensity, for example 200 HU, are marked as seeds. These voxels may include one or more voxels on the Aortic Ostia.

Optionally, at 304, additional distal seeds are found. These are voxels which are identified and marked in a distal location in relation to the aorta, on the surface of the heart. The distal seeds are optionally identified according to component classification, for example as described in U.S. patent application Ser. No. 12/624,519, "Method and System for Segmenting Medical Imaging Data According to a Skeletal Atlas," filed Nov. 24, 2009, which is incorporated herein by reference. Optionally, distal vessels fit a tubular shape with a minimum value of intensity, for example 150 HU.

At 306, some voxels may be excluded as seeds, for example to avoid propagation to the lungs. These seeds are filtered according to their connectivity to voxels with properties that are different from the properties of the target vessels. For example, if the organ is the heart and the target vessels are coronary arteries, vessel seeds located at the pulmonary tissues are filtered from the VOI. As described above, seeds may be selected on distal vessels. In order to filter seeds defined on non-target vessels, seeds that may be expanded, for example using morphological connectivity process, in a manner that enters the lungs are identified and filtered out. Optionally, this filtering is performed by thresholding the medical image, for example by convoluting a decrement filter, for example of a value between −998 HU and −500 HU and then identifying hole shaped elements having a radius of approximately 3 mm and intensity value above 150 HU as vessel anchors inside the lungs. The identified vessel anchors are expanded within a binary vessel mask defined by voxels above 150 HU and located outside the heart or on its boundary. Finally, seeds on the heart boundary that are connected to vessel lung anchors are removed from the set of seeds selected in 103 as described above.

At 308, the seeds are expanded, optionally simultaneously, each as an expanded seed component, optionally by a long-range balloon expansion process, for example as described in Sethian, J. A.: Fast marching method. SIAM Review, 41(2) (1999) 199-235, which is incorporated herein by reference. This process is optionally performed for each one of the seeds.

Optionally, each voxel in the VOI receives a local cost value according to its properties. For example, the local cost of each voxel is determined according to one or more of the following properties:

1. A local intensity. The local cost as a function of intensity is optionally changed dynamically during the expansion of the front, as data is gathered about the probability that a voxel of a given intensity will be a voxel of a target vessel.
2. The intensity of surrounding voxels. For example, in case the target vessels are coronary arteries the surrounding voxels are expected to have relatively low intensity as the coronary arteries are typically surrounded by muscle and/or fat.
3. A curvilinear shape measure that is based on the shape of a cluster of voxels that contains the voxel whose cost is being determined, for example based on eigenvalues of a Hessian matrix. The curvilinear shape measure may be referred to herein as a vesselness measure.

The following exemplary method for calculating the local cost function has been found by the inventors to work well, especially when the target vessels are coronary arteries. The local cost function is the sum of the cube of a "histogram cost," a "diagonal cost" and a "vesselness cost," each of which range between 0, for a voxel that is most likely to be from a target vessel, and 1, for a voxel which is least likely to be from a target vessel.

The histogram cost is optionally the average of the probabilities that the voxel being scored, and each of its 12 diagonal neighbors, is not a target vessel voxel. The probability that a voxel of a given intensity will not be a vessel voxel is optionally learned dynamically during the expansion of the seed, by keeping track of a histogram showing what fraction of voxels, at each intensity level, ended up being included in the mask as target vessel voxels. Alternatively, the histogram is fixed, and is learned, for example, from similar images that have been segmented previously. More details on the histogram cost are given in published US patent application 2008/0132774, "Vessel Centerline Determination," especially on page 22, items (a) through (g).

The diagonal cost depends on the number of neighboring voxels, for example among the 12 diagonal neighbors, that are already included in the vessel mask. For example, the diagonal cost is 0 if at least 6 of the 12 diagonal neighbors are already in the vessel mask. The diagonal cost goes from 1 to 0, for example linearly, as the number of diagonal neighbors already in the mask varies from 6 to 1, or from 6 to 0. US patent application 2008/0132774 also describes diagonal cost.

The vesselness cost is 1 minus a vesselness measure, which ranges from 0 for voxels least likely to be target vessel voxels, for 1 to voxels most likely to be target vessel voxels. The vesselness measure is based on eigenvalues of a Hessian matrix for the voxel, at one or more different distance scales typical of the diameter of the target vessels, for example 3 mm, 6 mm, and/or 9 mm in the case of coronary arteries. Any of the expressions for vesselness given by Rashindra Manniesing, Max A. Viergever, and Wiro J. Niessan, "Vessel enhancing diffusion: A scale space representation of vessel structures," Medical Image Analysis 10, 815-825 (2006), may optionally be used.

Optionally, each voxel is ranked with a local confidence score that determines the balloon expansion therefrom. The local confidence may be considered as amplification and/or reduction of constants that affect the local momentum of a propagating front starting from the related seed. The local confidence score is determined for each voxel during the marching when the process propagates from one voxel to another. A good local cost of the visited voxel increases the local confidence, and a bad local cost of the visited voxel decreases it. In general, the local confidence score depends not only on the local cost, but may depend on the past history of the local cost over the propagation of the front from the seed to the voxel being ranked, or at least on part of that past history.

Optionally, a local confidence is defined for a currently probed voxel according to a sum of the properties of the last 20 voxels for example, or another number may be used, such as 5, 10, 30 or 50. The local confidence is optionally used to determine whether or not to examine the neighbors of a certain voxel during the Fast Marching process. Optionally, the front of the expansion is ranked with a global confidence value and used for determining whether to stop the whole process altogether.

The inventors have found that the following method of calculating the local confidence works well, at least in the case where the target vessels are coronary arteries. The local confidence score is an inverse, or a negative, of a local risk score. The risk score is allowed to vary from a minimum value, for example 0, to a maximum value, for example 10. When the risk reaches the maximum value, the expansion stops at that point on the expansion front. At each new voxel encountered by the expansion front on a given expansion path, the risk is based on the risk at the previously encountered voxel, but is changed by a local cost, which can be positive or negative. The local cost is chosen so that it will be negative if a voxel is fairly likely to be a target vessel voxel. If the front is expanding along a fairly long region of voxels, for example a few tens of voxels, that are likely to be target vessel voxels, then the risk will continually decrease until it reaches the minimum value, and will remain there. Beyond that point, any memory of previously encountered high local cost regions will be lost. If the expansion path encounters a new region of relatively high local cost, where the voxels are not very likely to be target vessel voxels, then the risk will continually increase until it reaches its maximum value, and the expansion will stop on that path.

For example, the local cost function is optionally given by $$0.5(v>v_2)+0.25(h>h_2)+0.5(v>v_1)+0.5(h>h_1)-(v<v_1)$$

where $(v>v_2)$, $(h>h_2)$, $(v>v_1)$, $(h>h_1)$, and $(v<v_1)$ are logical values, set to 1 if the inequality in parentheses is true, and set to 0 if it false. Here, v is a vesselness cost of the voxel, and h is a histogram cost of the voxel, optionally the same as the vesselness and histogram cost defined above. The threshold constants are optionally set to be $v_2=0.3$, $v_1=0.6$, $h_2=0.2$, and $h_1=0.5$. Other values are optionally used for any of the constants in the expression for the local cost, but these constants have been found to work well, with the forms used for the histogram cost and vesselness cost, and for coronary arteries. This local cost function ranges from −1 for voxels that are most likely to be target vessel voxels, up to 0.75 for voxels that are least likely to be target vessel voxels.

During the expansion, the expanded seed components are optionally connected to create the blood vessel mask when their fronts meet at adjacent voxels. This procedure is useful for generating blood vessel masks that form undirected cycles.

As shown at 310, expanded seed components, that are not connected to the blood vessel mask, are optionally marked as distal vessel components and excluded from the processing of the blood vessel mask. One or more of the distal vessel components may be connected to the blood vessel mask in a later stage, for example as described below.

Optionally, at 312 a boost operation is performed. This boost expands the blood vessel mask further to unreached voxels of target vessels, for example artery voxels. It optionally includes the following several steps:

1. The accumulated path cost and the geodesic distance from a root voxel are optionally calculated for every voxel in the segmentation. The root voxel is, for example, a centrally located voxel in the mask, such as a voxel located at the center of the aorta between the aortic valve and the aortic arch, in the case of a coronary artery mask, which is likely to be connected to most parts of the mask. It should be noted that this accumulated path cost is not necessarily equal to the accumulated path cost that was calculated during the expansion step, since that path cost is not necessarily calculated from the root voxel, but may be calculated from distal seeds, for example. In addition, a different local cost function may be used in this step, than was used in the initial expansion of the seeds. Optionally, the path cost and distance are calculated using fast marching and more optionally, the propagation is stopped when the distance exceeds some threshold, for example 50 mm, or 100 mm, or 200 mm. The inventors have found that using such a distance threshold may improve performance of the boost operation.
2. Persistent local minima points of the negative of the distance function are optionally identified as points at a particular approximate distance from the root that represent the different branches of the segmentation. The persistency of the local minima is defined as the maximum height of a watershed basin originating in the local minima, before it flows down to a deeper catchment basin; see, for example, S. Beucher, The Watershed Transformation applied to image segmentation. Scanning Microscopy International, suppl 6, 1992, pp 299-314, which is incorporated herein by reference. Any termination point with a persistency that exceeds a threshold, e.g. 5 mm, 10 mm, or 20 mm, is optionally accepted. The points are optionally sorted according to their accumulated path cost from the root, and the first N (for example N=5, 10, 20, 30 or 50) points are optionally taken as boost points. This set is optionally enlarged by adding to it all the points of the segmentation within a fixed distance (for example 3, 5, 7 or 10 voxels) from the original points.
3. The boost points are taken now as seed points for a new expansion fast marching, similar to the above, and the new voxels that are reached are added to the blood vessel mask.

Optionally, a blood vessel is added to the segmentation. For example if the target vessels are in the liver, the main branch of one or more of the three vessel systems in the liver is added. In another example, the aorta segment is added to the blood vessel mask, in order to make it more likely that parts of the blood vessel mask expanded from different points on the surface of the aorta will merge into a single blood vessel mask.

At 314, the blood vessel mask is outputted.

Reference is now made, once again, to FIG. 2. At 105, after the blood vessel mask has been mapped or segmented, a graph is generated.

Figure 5:
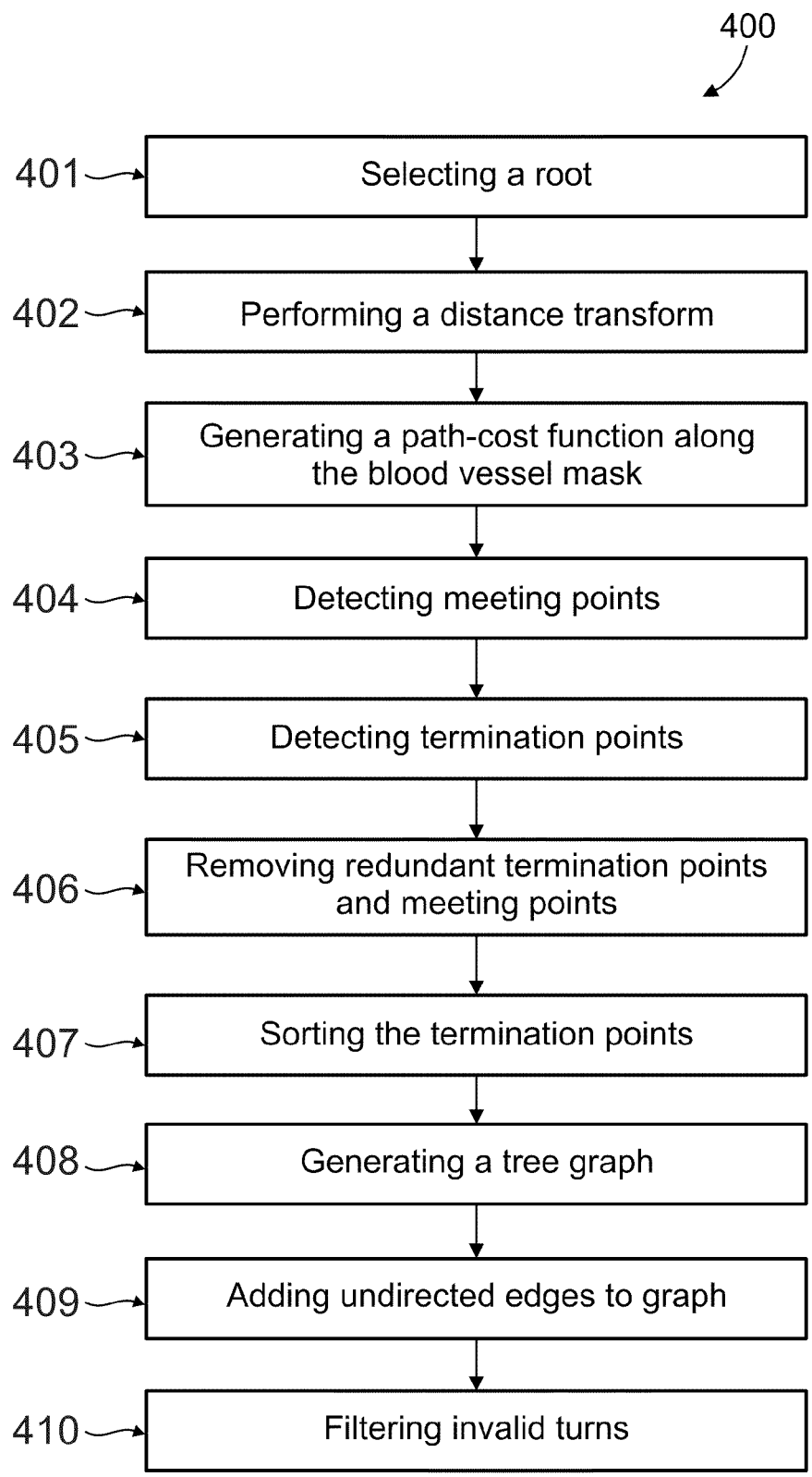
FIG. 5 is a flowchart of a process for generating a graph based on a connected component in the blood vessel mask, according to some embodiments of the present invention.

Reference is now made to FIG. 5, which shows a flowchart 400 of a process for generating a graph based on a connected component in the blood vessel mask, according to some embodiments of the present invention. The connected component may be referred to herein as a root component, because it is connected to the root voxel, for example a root voxel chosen in the center of the aorta. Optionally, more than one root may be used, and the root component may be different for different roots if they are not well connected to each other. During the process, local costs, distances from the root, and representatives are propagated, for example as described below. The local costs may be based on the distance from the boundary of the segmentation, referred to herein as a distance transform. Such a transformation may help to keep the skeleton of the network in the image, which corresponds to the edges in the graph, centered in blood vessels.

First, as shown at 401, a root is selected, optionally one of the seeds, although often the root voxel is not one of the seeds. For example, if the target vessels are the coronary arteries, the selected root may be an aorta seed, located near the center of the aorta between the aortic valve and the aortic arch.

Now, to assist later stages, as shown at 402, a distance transform is optionally applied on the blood vessel mask, giving the distance from the voxels of the root component to the nearest point on the boundaries of the mask.

At 403, optionally, propagation along the blood vessel mask is performed by traversing from the root outwards, for example using the aforementioned fast marching algorithm, to generate a path-cost function. The propagation speed is, for example, constant inside the aorta and for the rest of the root component is optionally proportional to, or an increasing function of, one or more properties of each voxel, for example to the vesselness measure thereof. The vesselness measure is optionally the local cost assigned in block 308, where high vesselness gets a low cost, or a different vesselness measure may be used. The local cost is optionally combined with a distance cost, optionally by an additive penalty term that has a large value on the boundary of the root component, and a value of zero for voxels sufficiently inside the components, for example 2 mm from the boundary. The penalty term optionally linearly decreases from the boundary to the inside of the component. The resulting path-cost function defines the shortest geodesic path from the root to every voxel of the root component, optionally by a gradient descent operation on the function.

At 404, undirected cycles in the root component are optionally detected. During the aforementioned propagation, the voxels are optionally divided into local regions of influence, for example by assigning a representative voxel to each voxel in the mask. Voxel representatives follow a tree structure originating at the root, and are spaced according to a distance measure, such as a Euclidean distance, or a geodesic distance, therefrom. Each representative has a parent representative (except the root), and a list of successor representatives. Optionally, representatives are set according to the Euclidean distance as follows:
1. The root is marked as the representative of itself;
2. For each voxel, the previous voxel along the propagation path, which may be referred to herein as a parent voxel and denoted herein as p, is identified, for example by gradient descent;
3. If the representative of p, denoted herein as r(p), is within a threshold distance d of the voxel, for example 0.5 mm, 1 mm, 2 mm, 3 mm, 5 mm, or 10 mm, or greater, smaller or intermediate values, then that voxel has the same representative r(p) as the parent voxel;
4. If the voxel under consideration is not within the threshold distance d of the parent voxel, then calculate the distance between p and each successor of r(p). Denote by s the closest successor. If the distance from s to the voxel under consideration is less than the threshold distance d, then the representative of that voxel is s;
5. Otherwise, set the current voxel to be a new representative and mark it as a successor of r(p).

Alternatively, the representatives are optionally set according to the geodesic distance on the blood vessel mask as follows:

1. The root is masked as the representative of itself.
2. For each new representative, the region of influence of the representative is determined by an expansion to all the connected voxels within the blood vessel mask, expansion stopping after a number of steps determined by a distance threshold d, which may have any of the values mentioned above. Each voxel within the region of influence marks the new representative as its own.
3. For each voxel, the previous voxel along the propagation path, which may be referred to herein as a parent voxel and denoted herein as p, is identified, for example by gradient descent.
4. If the voxel being considered already has an assigned representative, for example by being contained in a zone of influence of some representative, then its representative is set to be r(p), if it is not already r(p).
5. If the voxel being considered does not already have a representative, then set the current voxel to be a new representative and mark it as a successor of r(p).

Assigning representatives in one of these ways, or in a different way, allows detecting the meeting of opposing fast marching fronts. Each one of the distinct fronts has a different trail of representatives. If the representatives, or the parent representatives, are different, then a meeting point of the path fronts is optionally marked. The meeting point is the source of an undirected cycle in the graph.

At 405, termination points are detected. This is done, for example, by computing the geodesic distance from the root of the segmentation to each voxel, optionally during the aforementioned propagation. The negative of this distance determines a function over the segmentation. Persistent local minima points of this function are identified as termination points of the root component. The persistency of the local minima may be defined as the maximum height of a watershed basin originating in the local minima, before it flows down to a deeper catchment basin; see S. Beucher, "The Watershed Transformation applied to image segmentation," Scanning Microscopy International, suppl 6, 1992, pp 299-314, which is incorporated herein by reference. Any termination point with a persistency that exceeds a threshold, e.g. 5 mm, 10 mm, 15 mm, 20 mm or 30 mm, is accepted. The termination points will correspond to terminal nodes in the graph. As used herein, "terminal node," means a node that has only incoming edges connected to it, no outgoing or undirected edges. Such nodes are also referred to as "leaves" or "leaf nodes," for example in provisional U.S. patent application 61/179,386. But the expression "terminal node" is used herein, to emphasize that the graph is not necessarily a tree or forest graph, but may include undirected cycles.

At 406, redundant termination points, meeting points, and/or root voxels are optionally removed from a list that will be used to generate the graph. For example, termination points, and meeting points, which are marked inside an undesired area, are filtered out. For example, if the target vessels are the coronary arteries, then such points located in or near the aorta segment may be removed.

At 407, the length from the root is optionally used for sorting the termination points. Optionally, the termination points are sorted according to their geodesic distance (the length of the path) from the root.

At 408, a tree graph is generated. For each termination point, a corresponding new terminal node is created for the graph. To generate the rest of the graph, a path is found, for example by a gradient descent method, from each termination point toward the root. The path corresponds to an edge in the graph, connected to the corresponding terminal node. The path terminates before reaching the root if the distance from an existing path in the graph becomes less than a distance threshold, for example less than 1 mm, 2 mm, or 5 mm. In such a case, a new junction node is created in the graph at that point. The direction of the new edge is from the connection with the graph towards the new terminal node. The resulting graph is a tree at this stage, since every step adds a new terminal node, and no connections between existing nodes are made.

Optionally, multiple edges that are directed in the same direction between the same two nodes are sought and all but one of them is removed, particularly when the two nodes are not too far apart, for example less than 10 mm apart. For example, only the edge that corresponds to the shortest path portion in Euclidean distance, or the shortest path-cost integral, is kept, and the other edges are removed from the graph, or are marked for exclusion from consideration as parts of selected paths. Such multiple edges between the same two nodes are particularly likely to be due to noise or artifacts.

At 409, undirected edges are added to the tree graph, making it a non-tree graph. The undirected edges, which may also be referred to as bidirectional edges, for example in provisional U.S. patent application 61/179,386, correspond to portions of blood vessels in the image where it is not known in which direction blood is flowing, because they form real or apparent undirected cycles, places where the graph is not simply connected. Equivalently, these undirected or bidirectional edges may be treated as pairs of directed edges directed in opposite directions, both connecting the same two nodes, in which case the graph will be a directed graph rather than a mixed graph. The meeting points found in step 404 are used to define undirected edges. The connection to the existing graph is made by two gradient descent paths from the meeting point, each one optionally constrained by different representative voxels (for example, the descent step is limited to voxels with the same representative as the current voxel, or the same parent representative), and terminating when within a distance threshold of the existing graph, optionally the same distance threshold used at 408. The two gradient descent paths are optionally concatenated and correspond to a single new undirected edge on the graph.

At 410, paths are optionally selected and/or filtered according to local directionality of a segment of the paths, for example a turn having a local sharp angle. Optionally, the only paths considered for selection are paths whose edges in the graph are all either directed in a same direction along the path, or are undirected. This is also optionally true at any other times where paths are selected, for example as described in connection for FIG. 9. Optionally, paths having unexpected orientations and that therefore cannot originate from actual vessel paths are filtered from the graph, or not included in the selected paths. For example, if the target vessels are coronary arteries, a path having a sharp angle turn, which is not expected in such vessels, is excluded from the selected paths. Optionally, the filtering is performed as follows: for each incoming edge of each node the angle made by each outgoing edge is determined, for example by going backward and forward from the node, for example 5 mm, 10 mm, or 20 mm in each direction. In such an embodiment, the turn is marked as invalid if the angle exceeds a threshold, for example a 100 degrees turn. Optionally, as a result of this operation, some edges are tagged as invalid. The remaining edges, each corresponding to a discrete path of voxels in the image that connects two nodes, may be referred to herein as a skeleton of the blood vessel mask. In some embodiments of the invention, only the skeleton may be outputted, even without identifying named blood vessels in the image, or the skeleton may be used as input for other software that is used to identify named blood vessels in the image.

Figure 6:
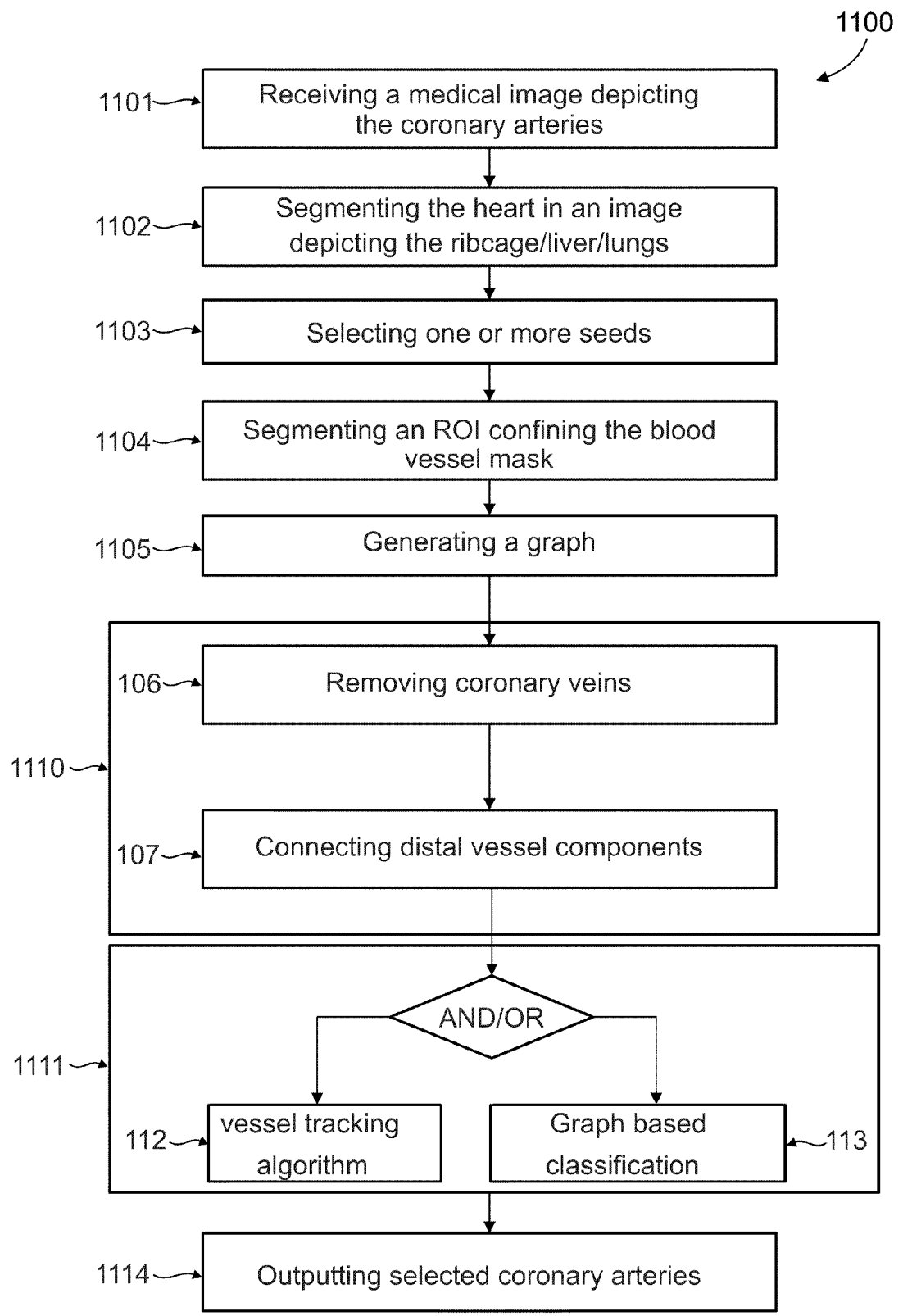
FIG. 6 is a flowchart for a method for mapping coronary arteries in a medical image, according to some embodiments of the present invention.

Reference is now made to FIG. 6, which shows a flowchart 1100 of a method for mapping coronary arteries in a medical image, according to some embodiments of the present invention. Blocks 1101-1105, 1110-1111, and 1114 of FIG. 6 correspond respectively to blocks 101-105, 110-111, and 114 of FIG. 2. However, in FIG. 6 these blocks are specific for coronary arteries, for example as exemplified above and below. FIG. 6 further depicts a process 106 of refining the graph by mapping the coronary veins in the VOI, which will be described in more detail in FIG. 7, and a process 107 of connecting distal vessel components which will be described in more detail in FIG. 8. It should be noted that in block 1103, one or more aorta seeds is selected, from voxels identified on the aorta surface, or inside the aorta, for example near the central axis of the aorta. At 1104 a blood vessel mask is found by expanding the aorta seed found in 1103. At 1111, blood vessels in the network are classified, for example they are identified with named blood vessels, using one or both of a vessel tracking algorithm at 112, and graph based classification at 113. Further details on vessel tracking algorithms are given below before the description of FIG. 9, and further details on graph based classification are given below in FIG. 9.

Figure 7:
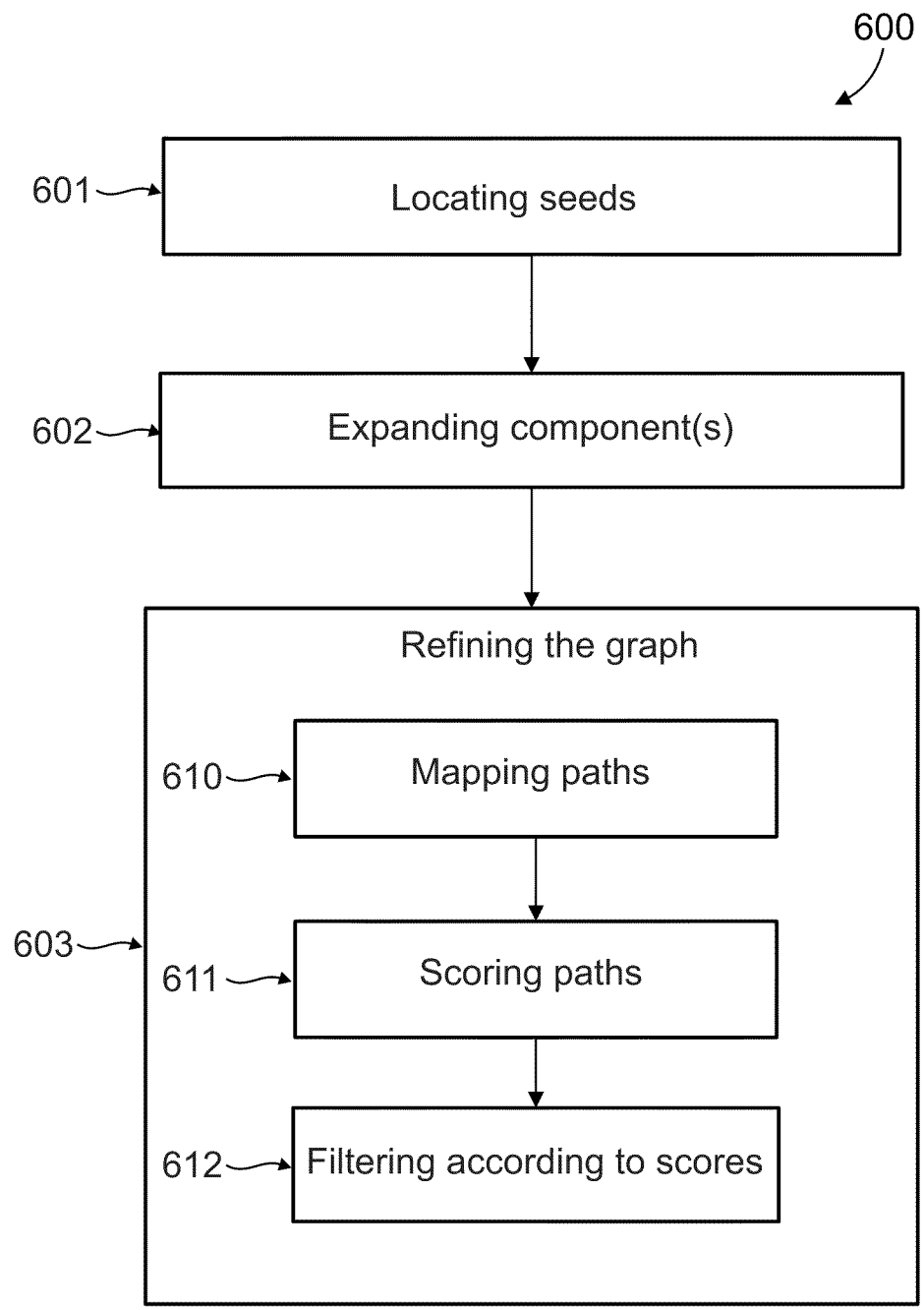
FIG. 7 is a flowchart of a process for refining a graph mapping an artery mask according to veins in the VOI, according to some embodiments of the present invention.

Reference is now made to FIG. 7, which is a flowchart 600 of a process for refining the graph, according to some embodiments of the present invention. Optionally, if the network of target vessels, for example coronary arteries, is associated with a second network of vessels, for example coronary veins, then refining is performed by mapping the second network of vessels, optionally by obtaining a mask of the second network of vessels and optionally generating a graph of the second network. Paths or portions of paths in the first graph that also appear in the second mask or graph, may have been included by error in the mask and graph of the first network of vessels, and are optionally filtered from the first graph, or excluded from selected paths in the first graph. The following description illustrates this process for the case of coronary arteries and coronary veins, but it can be used as well for other associated networks of vessels that may be confused with each other when segmenting a medical image.

In the following description use is made of the cardiac planes (long axis plane, short axis plane, and four chambers plane), which may be found automatically, optionally as described in U.S. Pat. No. 7,321,676, "Automatic determination of the long axis of the left ventricle in 3D cardiac imaging," the disclosure of which is incorporated herein by reference.

First, at 601, one or more coronary vein seeds are located, for example a coronary vein seed on an area depicting the coronary sinus. Optionally, the seeds may be marked automatically as follows. The coronary artery graph is inspected to detect edges that are associated with major coronary veins, such as the coronary sinus (CS) and/or the middle cardiac vein (MCV). This detection is based on the anatomy of the coronary veins with respect to the cardiac axes, as well as on their expected intensity and radius compared to coronary arteries. For example, the coronary sinus lies in the groove between the left auricle and ventricle and drains into the right atrium on the posterior inferior surface of the heart. Based on this knowledge, the search space for segments on the coronary sinus can be restricted as follows: (i) left of a plane parallel to the long-axis plane and located at some distance from it (for example, 35 mm), (ii) posterior to a plane parallel to the four-chamber plane and located at some distance from it (for example, 20 mm), and (iii) between a pair of planes parallel to the short-axis plane and located at predefined distances from it (for example, 40 mm and 80 mm on the side opposite from the heart apex). Similarly, the middle cardiac vein commences near the apex of the heart, ascends in the posterior inter-ventricular groove and drains into the right atrium either directly or via the coronary sinus (in most cases). Based on this knowledge, the search space for MCV segments can be restricted as follows: (i) inferior to a plane parallel to the short-axis plane and located at some distance from it (for example, 60 mm on the same side as the heart apex), (ii) posterior to the four-chamber plane, or to a plane parallel to the four-chamber plane and located at some distance from it, and (iii) between the long axis plane and a plane parallel to it and located at a predefined distance to the left of it (for example, 40 mm), or between a pair of planes parallel to the long-axis plane and located at predefined distances from it. In the restricted search space, the vessel segments associated with edges of the artery graph are optionally examined to determine whether or not they are part of the vein under inspection based on one or more of their direction, intensity and radius. The direction of the vessel is defined with respect to one or more of the heart planes. For example, the angle of the coronary sinus with respect to the short-axis plane is expected to be below some threshold, while the same angle for the MCV is expected to exceed a threshold. The radius of the major veins is expected to be wider than the radius of arteries in the same location, while their intensity is expected to be lower. Then, if the artery graph contains edges suspected to be associated with major coronary veins, seeds on these veins are optionally located, for example the midpoints of the edges.

Then, at 602, the one or more coronary vein seeds are optionally expanded to form a component that is limited to the major coronary vein area. The expansion is carried out within a binary vein mask. Optionally, the vein mask can be defined by voxels above a selected HU value, for example 120 HU, closed with a morphological 'connectivity-dilation' operation in a connectivity mask defined by voxels above another selected HU value, for example 80 HU. The connectivity-dilation operation optionally performs a number of consecutives dilations, for example two dilations, but optionally only into the connectivity mask. The one or more coronary vein seeds are optionally expanded into a component inside the resulting binary vein mask by a morphological 'connectivity-dilation' operation, but optionally only up to a fixed distance, for example 5 mm. The component is optionally further expanded to allow the mapping and/or segmentation of a single vessel mask that depicts the coronary veins. Optionally, the expansion is performed, similarly to the expansion described above for coronary arteries, by a long-range balloon expansion algorithm that obtains coronary vein segmentation. Similarly to the aforementioned segmentation, the local cost of each voxel optionally depends on voxel intensity, intensity of the surrounding voxels, and/or curvilinear shape measure where the properties are adjusted to veins, optionally specific veins. For example, when compared with arteries, the intensity of veins is generally lower and their radii are generally wider. In a manner similar to that applied on the coronary artery mask, one or more roots is optionally selected for a connected root component in the coronary vein mask (for example a central voxel on the coronary sinus), and a distance transform is optionally used, to keep the skeleton of the vein network centered in the veins, and representative voxels are optionally found, to determine meeting points of two propagating fronts in the expansion. Optionally, a graph is further generated for veins similarly to the one generated for arteries.

Now, at 603, the vein segmentation, or the vein graph, is used for refining the artery graph by removing edges that are believed more likely to be associated with veins, or by excluding paths with those edges from consideration as selected paths in the artery graph. Optionally, the filtering is carried by the following procedure:

1. As shown at 610, a path from the aorta and a path from the coronary sinus to each midpoint of the artery graph edges are calculated. Optionally, a gradient descent is used to compute these paths. Alternatively, if a vein graph is available, then the paths can be computed as the best paths in the graphs from the one or more roots to the respective edges.
2. As shown at 611, each path is scored according to the properties of the voxels therealong, for example according to the intensity, the radius of the represented vessels, optionally computed by distance transform, and the path directionality. The properties depend on the type of the vessel, for example an artery path is calculated according to artery properties and a vein path is calculated according to vein properties. Optionally, the path score is the same as any of the options for the artery score described below for the procedure at 902 in FIG. 10.
3. At 612, edges are filtered according to their scores. If the score of a vein path corresponding to the edge is higher than the score of an artery path corresponding to the edge, then the edge is filtered. Otherwise, the edge remains for consideration as part of a selected artery path.

Reference is now made, once again, to FIG. 6. At 107, after veins have been removed from the root component, distal vessel components may be connected to the root component. As described above, a number of distal vessel components have been marked during the expansion of the blood vessel mask.

Figure 8:
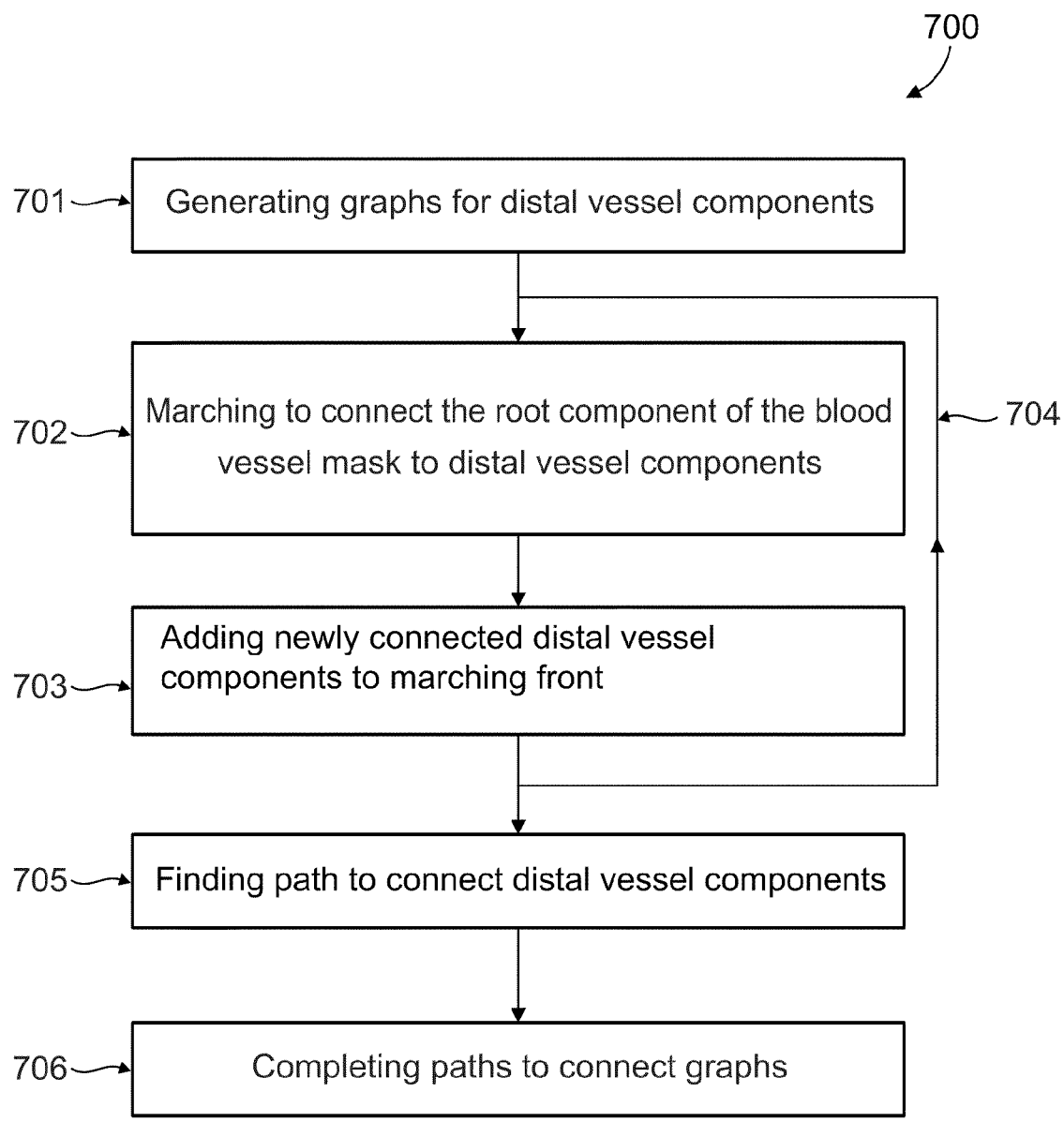
FIG. 8 is a flowchart depicting a process for connecting the root component of the blood vessel mask to distal vessel components of the mask.

Reference is now made to FIG. 8, which is a flowchart depicting a process for connecting the root component of the blood vessel mask to distal vessel components, according to some embodiments of the present invention.

First, at 701, a separate graph, with corresponding connected paths of voxels in the image, is generated for each distal vessel component, for example using the aforementioned method that is described above.

Then, at 702, each one of the graphs of the distal vessel components is separately connected to the original graph corresponding to the root component of the blood vessel mask, if the distance between their corresponding voxels in the image, optionally the geodesic distance between them, is shorter than a certain distance threshold. Optionally, a connection is established to a distal vessel component if the shortest geodesic path between the root component and that distal vessel component passes through a structure having properties of a blood vessel from the network being analyzed, such as an artery in the case of an artery network, for example according to the properties of the connecting voxels. Optionally, the connection is performed by marching from the boundaries of the root component of the blood vessel mask, with the accumulation of a local cost of the voxels, until a voxel marked as belonging to the distal vessel component is encountered. Optionally, a histogram cost, which depends on the intensity of the voxels, is used, for example the histogram cost as described above for the expansion of seeds at 308, in FIG. 4.

Optionally, as shown at 703, only terminal nodes of the graphs of the distal components are designated for connecting between the graphs. In such an embodiment, the local cost of the voxels of the distal vessel components that are not termination points (voxels mapped to terminal nodes in the graph) are marked with infinite local cost, so that the root component may be connected only through termination points of the distal vessel components. When the marching reaches a termination point in a distal vessel component, this point is added to a list of connection points, and in addition the boundary of the respective component is optionally added to the expanding front for the fast marching algorithm, so that the fast marching may now spread from this component and other distal components may become connected to the root through this component. Then, as shown at 704, the marching continues until it reaches the next distal vessel component. Optionally, the propagation is stopped after a fixed number of fast marching steps, for example two million, and/or it stops by itself when reaching an infinite cost value.

Now, at 705 and 706, when all the distal vessel components that are within a certain distance, optionally geodesic, from the root component of the blood vessel mask are reached, the respective graphs of the distal vessel components are connected to the graph of the root component, starting from the terminal node of the distal vessel component reached in the fast marching.

Optionally, at 705, a path from the termination point of the distal vessel component reached during fast marching to the boundary of the root component (or another distal component that has previously become connected to the root component) is calculated, optionally according to gradient descent that is applied over a path-cost map that is derived, for example, from the fast marching. Now, at 706, the path from the boundary of the blood vessel mask to a nearby point within its skeleton is completed, for example by propagating a second highly-local fast marching with a uniform local cost within the mask until reaching a skeleton voxel, then following the gradient descent path generated from this local fast-marching path cost. In such a manner, the path from each connection point along the blood vessel mask boundary to the blood vessel mask skeleton is completed.

Reference is now made, once again, to FIG. 2 and to FIG. 6. Now, at 111 in FIG. 2 and 1111 in FIG. 6, after the blood vessel mask has been adjusted using the graph, one or more blood vessels in the blood vessel mask are classified. Optionally, if target vessels are coronary arteries, as shown in FIG. 6, the classification may be performed by vessel tracking, as shown at 112 and/or by using the graph, as shown at 113. These processes 112 and 113 allow choosing a set of selected coronary arteries and constructing a map of a coronary artery per data point.

The vessel tracking may be performed using known vessel tracking algorithms, for example as described in International Patent Application Pub. No. IL2004/001169 published on Jul. 28, 2005, U.S. Patent Application Pub. 2008/0132774 published on Jun. 5, 2008, and European Patent Application No. 04806700.3 published on Oct. 11, 2006, which are incorporated herein by reference. The vessel tracking algorithm serves as an expert algorithm for a specific vessel that is selected to be classified according to its anatomy. For example, the specific vessels may be the left anterior descending artery (LAD), the left circumflex artery (LCX), and/or the right coronary artery (RCA). In order to perform such a classification, distal points from the aorta are found using the blood vessel mask, and/or directly on the graph, as described below. To ensure that these points are potential vessel points, points that are more probable to be on an artery rather than on a vein are found. For each one of these points, a vessel tracking algorithm designated to find the specific vessel is launched.

Figure 9:
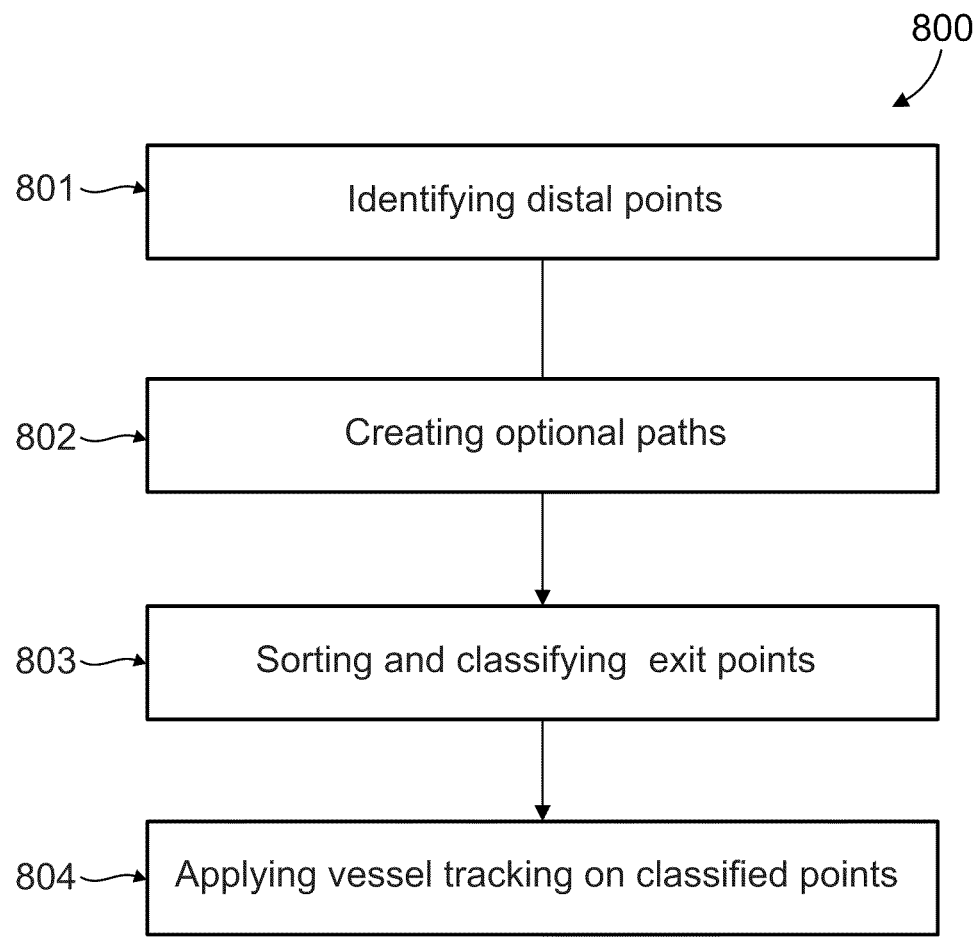
FIG. 9 is a flowchart of a method for identifying specific vessels, according to some embodiments of the present invention.

Reference is now also made to FIG. 9, which is a flowchart 800 of a method for identifying specific vessels, according to some embodiments of the present invention.

First, at 801, distal points are found on the blood vessel mask. A representative is optionally selected from the voxels in the image that map to each edge of the graph whose mapping in the image includes voxels around a certain distance from the aorta point, for example 100 millimeters. For instance, the representative may be the first voxel, corresponding to each graph edge, that passes the certain distance. In addition, we take each terminal node in the graph that maps to a termination point in the image whose distance from an aorta point, for example the aorta root, is above a certain minimal distance, for example 75 millimeters.

Now, as shown at 802, optionally paths are created for each of these points, for example by a regression process. Optionally, a gradient descent is used for performing this regression from each one of these points toward an origin point, such as an aorta point. Optionally, an exit point from the aorta and an additional reference point in a specified distance therefrom, for example 50, 60, 80 or 100 millimeters, are found along this path. Optionally, a plane traversing the aorta point in parallel to the aorta direction and along a vector in the direction of 45 degrees, for example, between x axis and y axis is used to determine if the point is located on the left side or on the right side of the heart.

Now, at 803, the exit points are sorted and classified. In order to sort and filter these points, exit points from the aorta are identified, and ordered by the number of paths that have been identified as emanating therefrom. The one or more exit points with the largest number of emanating paths are marked in each side. These exit points are associated with the main left ostium and the main right ostium. The other exits are treated as bypasses or noises. The points from each exit are sorted according to their path costs.

The sorting allows classifying a specific number of points from each exit point, for example, the 4 best points from the left exit, 1 best point from the right exit and 2 best points from the bypasses exits. In such an embodiment, a vessel tracking algorithm may be launched from the aorta point to each one of these points.

Now, as shown at 804, after the vessel tracking algorithm is completed for each one of the selected points, the best paths to the terminal nodes in the graph of the blood vessel mask are identified. As the selected points are known in advance, the identity of the vessels may be automatically obtained.

Additionally or alternatively, as described above, the identifying of the specific vessel may be performed using the graph. In such an embodiment, for each terminal node in the graph, the best path up to the root, for example the best path to the aorta seed, is calculated. First, a set of all the paths to the root is generated for each terminal node in the graph. The set is created with a number of graph-based restrictions, for example passing through each edge only once. The following criteria are used to compare the potential paths and choose the best path for each terminal node:
1. Length: Optionally, a long straight path receives a high score, whereas a windy path that passes through many points but ends up not far from its start receives a low score. In such a manner, paths are penalized for taking long detours, which may indicate that they pass through the coronary veins or other incorrect structures.
2. Intensity pattern: The path should not indicate a relatively steep drop in the intensity of voxels therealong. Such a steep drop indicates a possible deviation from an artery into a vein. If, however, there is a sudden drop in intensity that was preceded by a similar rise in intensity, this may indicate passage through a stent or calcification and should not be penalized.
3. Radius/Caliber: Various vessels have different estimated caliber with estimated caliber changes therealong. The suitability of the caliber pattern of the path is optionally one of the criteria. For example, the radius of a coronary artery is estimated to fall gradually along the path from the aorta seed, the root, to the end of the artery, the terminal node. A sudden rise in the radius may indicate a deviation from the artery into a vein. A steady growth in radius along the path may indicate that this section of the path runs through a vein rather than an artery. The suitability of the paths to this pattern may be used for the selection.
4. Local path directionality: For example, if the target vessels are coronary arteries, paths with sharp turns and/or long sections that ascend rather than descend from the aorta are penalized.

Then, after the best potential paths have been selected, the main vessels are selected and optionally a vessel-per-point map is created. Each point on the graph is associated with the best path that connects it to the aorta and with the best path from a terminal node to the aorta passing therethrough or in proximity thereto for example in a distance of up to a fixed distance, for example 1, 2, 4 or 7 millimeters, optionally using similar criteria to those used for selecting the best path from each terminal node to the aorta. In addition, some of the vessels are selected from these paths and the paths obtained by the vessel tracking algorithm, so that the main coronary arteries, LAD, RCA, and LCX, and some bypasses thereof, are covered. Similarly to the above, the vessel tracking algorithm may be launched with each one of the paths as a starting point, to get segmentation for each vessel and optionally the centerline thereof.

Figure 10:
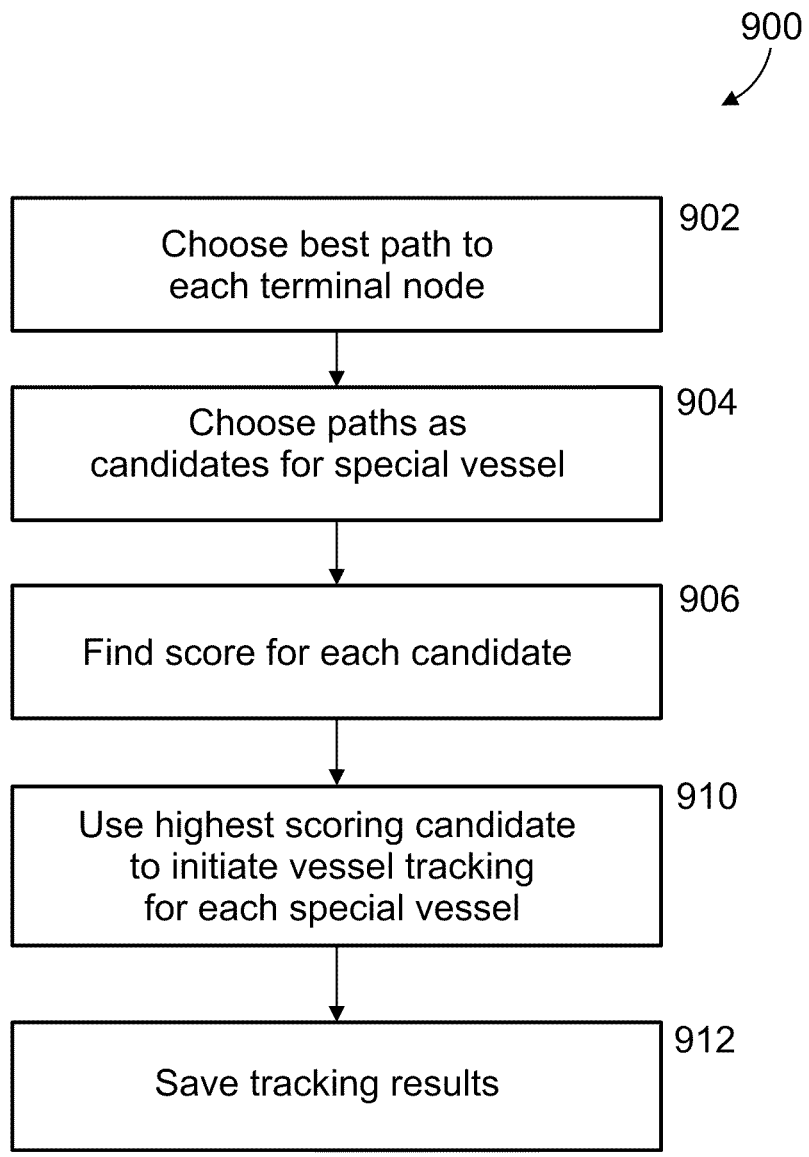
FIG. 10 is a flowchart of a method for identifying and segmenting special vessels, such as major named coronary arteries.

Optionally, some special vessels, such as the LAD, the RCA and the LCX, are identified and segmented based on the graph. FIG. 10 shows a flowchart 900 illustrating how this is done, in an exemplary embodiment of the invention. Although flowchart 900 is described with reference to identifying coronary arteries, the method may be used for other blood vessel networks as well.
1. At 902, a best path is chosen for each terminal node in the graph. All the paths are found that reach a specific terminal node starting from the root. Optionally, the only paths considered are those in which all edges are either directed edges going in the direction of the path, or undirected edges. For each path, a score is calculated that describes how likely that path is to be a coronary artery. Optionally the score is based on the path's length, its smoothness, and its uniformity, For example, the score is higher if there are no large changes in intensity and radius of the vessel along the path. The best path for each terminal node is the one that has the best score.
2. At 904, for each special vessel, some of the best paths to the terminal nodes are chosen as candidates, for example according to their geometry and location. A voxel in the image, corresponding to a point on the path, is optionally chosen at a specific distance from the root, for example 2, 3, 4, 5 or 7 cm. If, for example, this point lies on the right side of a line traversing the image through the aorta point at 45 degrees to the principle axes, we take optionally it as an RCA candidate. To choose candidates for the LAD and LCX, we optionally consider the point projected onto the four chambers plane, and call the distance from the long axis plane x (positive to the left of the long axis plane), and the distance from the short axis plane y (positive in the direction opposite to the heart apex). If this point satisfies y<0 and x<y<-x, this path is optionally chosen as an LAD candidate, If this point satisfies x>0 and y>0 this path is optionally chosen as an LCX candidate.

3. For each candidate, a score is calculated at 906. The score is optionally based, as above, on the length, smoothness, uniformity and non-self-intersection of the paths. The score may be calculated differently for different candidates groups.

4. At 910, the highest scoring path for each special vessel is used to initialize vessel tracking processes, as described above, and to obtain a vessel description for each special vessel. The results of the vessel tracking are optionally saved at 912, for later outputting.

The inventors have found that the following method works well when finding the best path ending at a given terminal node, at 902, at least for the case of coronary arteries. Optionally, self-intersecting paths are excluded from consideration as the best path to a given terminal node. Optionally, paths are excluded from consideration if they go in the cranial direction, as they go away from the aorta, by more than a certain fraction of the length of the path, for example more than 10% of the length of the path, reflecting the fact that coronary arteries generally go in the caudal direction as they go away from the aorta. For the remaining paths, an artery score is calculated, depending on a change in intensity, and a change in radius, across junctions in the path, corresponding to nodes along the path on the graph. Coronary arteries are expected to get fainter and narrower, in the direction outward from the aorta, and any path that shows an increase in intensity, and an increase in radius, going outward from the aorta, is likely either not to be a coronary artery, or to be a coronary artery being followed in the wrong direction, so such paths should get a low artery score. The change in intensity and radius is examined at junctions, because that is where a path is likely to jump to the wrong blood vessel. The intensity and radius before and after each junction are measured, and optionally averaged over a short distance to reduce the effects of noise, for example over a length of 20 voxels on each side of the junction. A score is found for each junction. For example, D is defined as the incoming intensity minus the outgoing intensity at the junction, and R is defined as the ratio of the outgoing radius to incoming radius at the junction. Then the junction score, for example, is given by:

| Score(R, D) | R ≤ 1 | 1 < R ≤ 1.5 | 1.5 < R ≤ 2 | R > 2 |
| --- | --- | --- | --- | --- |
| D ≥ 0 | 1 | 1 | 1 | 1 |
| 0 > D ≥ -100 | 1 | 0.9 | 0.7 | 0.4 |
| -100 > D ≥ -180 | 1 | 0.7 | 0.3 | 0.2 |
| -180 > D | 1 | 0.4 | 0.2 | 0.1 |

Optionally, the artery score is based on the minimum of all the junction scores along the path, so that if a path has even one suspicious junction that does not look as expected for an outward going coronary artery, it will probably not be chosen as the best path. Optionally, the artery score is an average of the minimum junction score, and a length score, which is defined, for example, as 1 minus the ratio of the length of the path, to the length of the longest of all the paths being considered that end at that terminal node. A false path, which jumps from the artery to a vein, or to another artery, or to an artifact, and then back to the original artery again, is likely to have a longer path than a correct path for the coronary artery that ends at that terminal node, and the length score penalizes those false paths. The artery score is used to choose the best path reaching that terminal node.

The following method for choosing a path for tracking a special vessel, in 906, has been found to work well for tracking major coronary arteries. As in 902, self-intersecting paths are optionally excluded from consideration. The artery score optionally is found by averaging the length score, and the lowest junction score on the path, as described above for 902, but optionally the average also includes a third component, a turn angle score reflecting the sharpness of turns in the path at junctions. Coronary arteries, especially single named coronary arteries, generally have junctions where the turns are not too sharp, and do not vary much for different junctions. The turn angle score is defined, for example, as 1 minus the product of the angle costs for each junction along the path. This angle cost, in turn, is defined as a normalized ratio between the cosine of the junction angle to the cosine of the sharpest turn in this junction of all paths in the graph that pass through this junction. This ratio is normalized by adding 1 to this ratio and dividing the result by 2 in order to make the result between 0 and 1. The angle cost of turns with turn angle greater than 90 degrees is 1.

Now, as shown at 114 in FIG. 2, and 1114 in FIG. 6, the segmented and/or mapped vessels, for example LAD, RCA, and LCX, are outputted. This may be done using the results of vessel tracking in either process 112 or 113, or both, in FIG. 6. The presentation may be performed by marking the vessels on a medical image that is presented to the user and/or as a separate image, allowing the user to examine each vessel, for example coronary artery, separately. Approximate centerlines of the vessels, the voxels in the skeleton of the vessel mask, are optionally displayed in the image as well. The output may be used for segmenting organs from the target blood vessels. In such an embodiment, the vessels are cropped from a presentation of a medical image, allowing the user to diagnose the organ without the vessels. The output may allow detecting abnormalities, such as aneurism, narrowing, stents, and calcifications.

Other output modes may be used to assess the accuracy of the tracking and identification of the vessels, and to manually choose the next best candidates if the best candidates are judged not to be the correct ones. For example, the entire graph may be displayed, optionally as it is mapped to the image. A graphical user interface, such as that described in provisional U.S. patent application No. 61/264,676 filed on Nov. 26, 2009, many allow a user to pick a particular terminal point, or a particular edge in the graph, and to display, in order of score, the different paths that end at that terminal point, or that include that edge. Such a user interface optionally allows the user to accept the highest scoring path, either for a given terminal point or for a given special vessel, or to reject the highest scoring path and to pick a different one instead.

Figure 11:
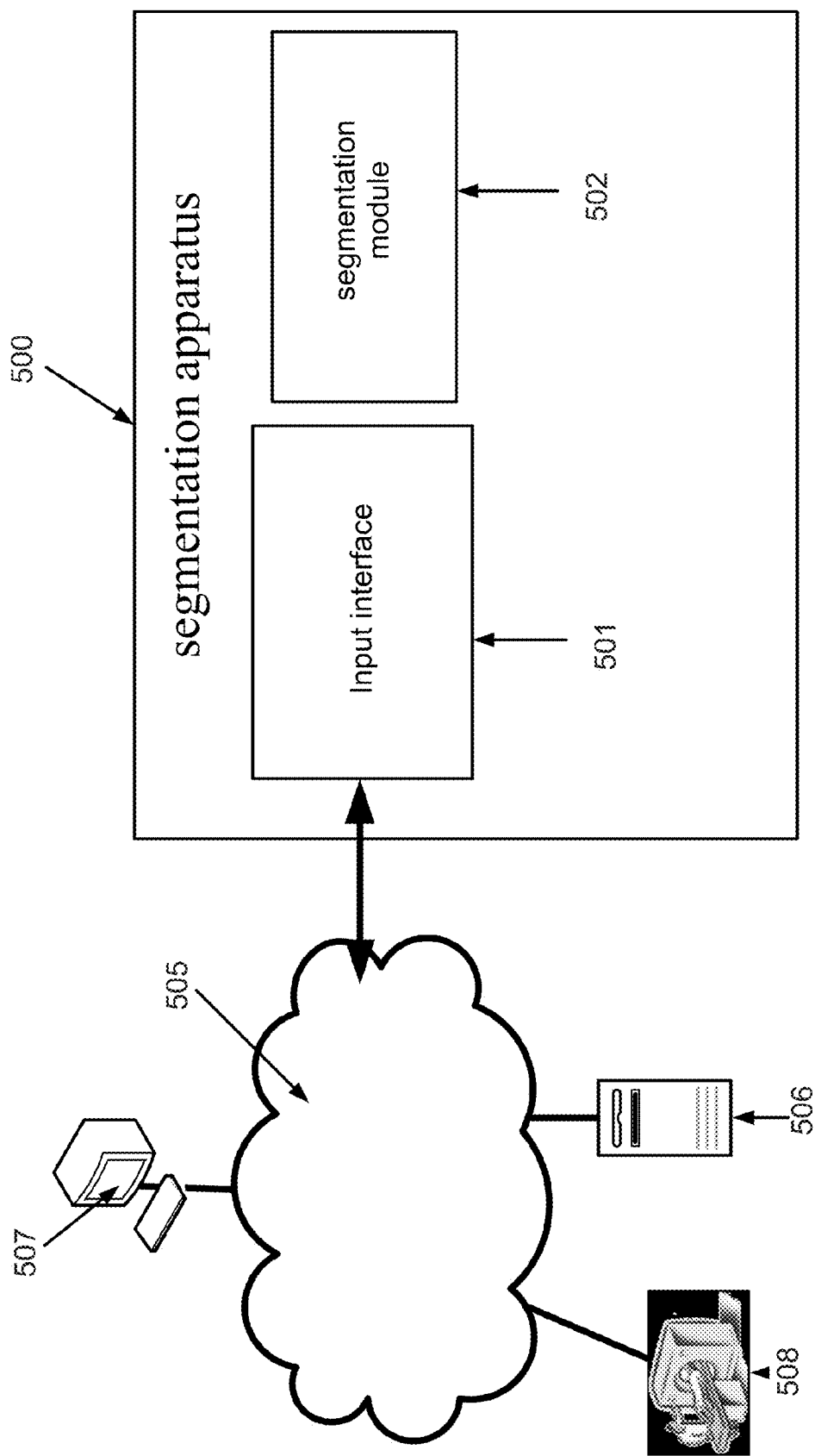
FIG. 11 is a schematic illustration of an apparatus, connected to a communication network, for analyzing the structure of networks of blood vessels in medical studies, according to some embodiments of the present invention.

Reference is now also made to FIG. 11, which is a schematic illustration of an apparatus 500 optionally connected to a communication network 505, such as the internet, for segmenting blood vessels in medical studies, for example according to the method depicted in FIG. 2, according to some embodiments of the present invention. The apparatus comprises an input interface 501 configured for receiving a medical image, such as a CT study of the heart. The input interface 501 optionally receives the medical image from remote medical databases 506, an imaging modality 508, and/or a remote client terminal 507, for example as described in published US patent applications 2009/0287500A1, "Distributed Integrated Image Data Management System," and 2009/0287504A1, "Methods, Systems, and a Platform for Managing Medical Data Records," both published Nov. 19, 2009, the content of which is hereby incorporated by reference. The apparatus 500 further comprises a segmentation module 502 for segmenting blood vessels in the received medical image, for example as described above in relation to FIG. 2. The segmentation module optionally comprises a mask calculating module, and a graph generating module, which respectively calculate a mask of a network of vessels in the image, and generate a graph of the network of vessels, as described above in relation to FIG. 2 and the other drawings. These modules comprise hardware, such as a CPU and memory, and software modules loaded into a computer memory or readable media, for performing their respective tasks. They may share hardware, or use separate hardware. The hardware may be a general purpose computer, such as a personal computer, or specially dedicated circuitry. Optionally, the segmentation described hereinabove may be used for segmenting medical studies in a medical database 506, such as a Picture Archiving and Communication System (PACS). Such an application may be activated automatically and/or according to user inputs (UI), such as UI received via a directed graphical user interface (GUI), for example as described in Provisional U.S. Patent Application No. 61/264,676 filed on Nov. 26, 2009. The user inputs optionally allow a user to select a VOI, such as the heart or the liver, in a medical image. Such a selection may be used for linking the user to data related to the segmented vessels, changing the presentation of the segmented vessels, notifying the system that these segmented vessels and/or target organ have been probed, and/or adding an analysis related to the segmented vessels and/or a related organ that has been probed. Additionally or alternatively, such segmentation allows integrating a PACS into an external anatomy and pathology database that is based on the segmented organ and/or vessel. The user clicks on the segmented organ and/or vessel and the relevant information from the PACS database is displayed.

Any distances mentioned herein, for example in millimeters or in terms of voxels, may be greater or less than the values mentioned by 10%, 20%, 30%, or a factor of 1.5, 2, 3, or 5, optionally rounded off to an integer number of voxels, or smaller, greater, or intermediate values, in some embodiments of the invention. Any image densities mentioned herein may be greater or less than the values mentioned by 10 HU, 20 HU, 30 HU, 50 HU, 100 HU, 150 HU, or 200 HU, or smaller, greater, or intermediate values, in some embodiments of the invention.

It is expected that during the life of a patent maturing from this application many relevant systems and methods will be developed and the scope of the term medical image and segmentation is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of analyzing structure of a network of vessels in a medical image, comprising:
   receiving the medical image depicting the network of vessels;
   obtaining a mask of the network of vessels in the image;
   generating a graph, comprising points connected by edges, mapping a plurality of paths of vessels in the network to directed paths in the graph, with each edge in the graph either directed to indicate a known direction of flow in the corresponding vessel, or undirected to indicate a lack of knowledge of direction of flow in the corresponding vessel, and with all directed edges in a path directed in a same direction as the path;
   wherein said generating comprises generating in the graph at least two different paths connecting a same pair of the points, the two different paths constituting an undirected cycle, and wherein a computer or other device is programmed to carry out the method.

2. A method according to claim 1, wherein obtaining a mask comprises identifying at least one seed voxel in the medical image and expanding each seed voxel to a plurality of neighboring voxels in the medical image.

3. A method according to claim 2, wherein said expanding is performed according to at least one voxel property of said plurality of neighboring voxels.

4. A method according to claim 3, wherein said at least one voxel property comprises a member of a group consisting of: a local intensity, an intensity of surrounding voxels, and a geometric shape of a cluster of voxels.

5. A method according to claim 2, wherein said expanding at each voxel reached is performed according to at least one voxel risk score that changes from one voxel to a next voxel on each path taken by the expansion, the risk score increasing when a local cost function is positive, and decreasing when the local cost function is negative, but not decreasing below a minimum value, the expansion on that path stopping when the risk score reaches a maximum value.

6. A method according to claim 2, wherein obtaining a mask comprises identifying a plurality of seeds and selecting said at least one seed according to a location in the medical image.

7. A method according to claim 6, further comprising excluding at least one of said plurality of seeds according to connectivity thereof via a group of selected voxels to another of said plurality of seeds or to a set of voxels identified as belonging to a particular organ or tissue.

8. A method according to claim 7, wherein obtaining a mask further comprises selecting said at least one seed from a plurality of voxels having a property indicative of an artery according to a connectivity thereof via a group of selected voxels, while excluding at least one voxel having a property indicative of at least one of a vein and a lung vessel.

9. A method according to claim 2, wherein the at least one seed voxel comprises a plurality of seed voxels and obtaining a mask further comprises connecting each said expanded seed voxel to another said expanded seed if said expanding passes via adjacent voxels.

10. A method according to claim 2, wherein said identifying further comprises mapping an aorta segment, identifying one or more aorta seeds in the aorta, and separately expanding said one or more aorta seeds to a plurality of connected voxels in said medical image.

11. A method according to claim 10, wherein said mapping is performed by identifying a fit of a shape template in said medical image and identifying the orientation of at least one of the longitudinal axis and the aorta valve in said medical image.

12. A method according to claim 1, wherein generating a graph comprises identifying a root voxel in the image and growing a region of vessel voxels from the root voxel, and determining a meeting point where two fronts of the growing region, coming from two different directions, meet in the image.

13. A method according to claim 12, wherein the root voxel is in the mask, and growing the region of vessel voxels is confined to the mask.

14. A method according to claim 12, wherein determining a meeting point comprises assigning a succession of representative voxels and their corresponding local volumes of influence, for a plurality of portions of the growing front, and determining when a point on the front has a succession of representative voxels extending in two different directions.

15. A method according to claim 12, wherein generating the graph comprises tracing two paths in the image back from the meeting point toward the root voxel, the two paths being traced along vessels in the mask respectively in the two different directions that the fronts came from, the tracing back of each path ending when reaching the root voxel, or when reaching another path, the root voxel and voxels where paths meet other paths in the image corresponding to nodes in the graph, and portions of paths between such voxels corresponding to edges in the graph.

16. A method according to claim 15, wherein generating the graph also comprises tracking one or more paths in the image back from a termination point to the root voxel, each path going along at least one vessel in the mask, the tracing back of each path ending when reaching the root voxel, or when reaching another path.

17. A method according to claim 16, also comprising outputting a skeleton of the network comprising a set of voxels that the traced back paths traverse.

18. A method according to claim 15, wherein generating the graph also comprises assigning a direction to each edge for which the corresponding path portion in the image does not include a meeting point, but making undirected any edge for which the corresponding path portion in the image includes a meeting point.

19. A method according to claim 15, wherein tracing back the path comprises using a gradient descent method.

20. A method according to claim 1, also comprising selecting at least one of the paths in the graph according to at least one path property of said path in the graph or of the corresponding path in the image.

21. A method according to claim 20, wherein selecting at least one of the paths comprises selecting no more than one of a pair of paths that take different routes between a same pair of nodes, for at least one pair of such paths in the graph.

22. A method according to claim 20, wherein said at least one path property is a member of a group consisting of length, intensity pattern, local path directionality, and geometry of a vessel that the path goes along.

23. A method according to claim 20, also comprising classifying at least one vessel that at least a portion of one of the selected paths goes along.

24. A method according to claim 23, wherein the network comprises a network of coronary arteries, and the classified vessels comprise a member of a group consisting of the left anterior descending artery (LAD), the left circumflex artery (LCX), and the right coronary artery (RCA).

25. A method according to claim 23, wherein the network comprises a network of liver blood vessels, and the classified vessels comprise a member of a group consisting of the hepatic arteries, the hepatic veins, and the portal veins.

26. A method according to claim 23, wherein classifying comprises using properties of the graph.

27. A method according to claim 23, wherein classifying comprises using a vessel tracking algorithm.

28. A method according to claim 23, wherein classifying comprises using a member of a group consisting of a Euclidean length of at least a portion of the selected path that goes along the vessel, an intensity pattern of said path, an estimated caliber of the vessel, and directionality of at least a portion of said path.

29. A method according to claim 20, wherein the network of vessels is a first network of vessels, associated with a second network of vessels in the same image, the method further comprising obtaining a mask of the second network of vessels, and wherein selecting comprises looking for matches between at least a portion of one or more paths in the image corresponding to an edges in the graph, and portions of the mask of the second network, and excluding at least one of those paths from selection in the graph.

30. A method according to claim 29, also comprising generating a second graph mapping a plurality of the vessels in the second network using the mask of the second network, wherein looking for matches comprises looking for matches between at least portions of paths in the image corresponding to an edge in the first graph and an edge in the second graph.

31. A method according to claim 29, also comprising classifying said matched portions as belonging to either the first network, the second network, or neither of them, wherein excluding comprises excluding a path for which said matched portion is classified as not belonging to the first network.

32. A method according to claim 29, wherein the first network comprises a network of arteries and the second network comprises a network of veins.

33. A method according to claim 1, wherein obtaining a mask comprises identifying a plurality of seed voxels and growing each seed voxel to generate a plurality of disconnected vessel masks, generating a non-forest graph comprises generating a plurality of disconnected graphs each mapping at least one path in a different one of said plurality vessel masks, and the method also comprises using the plurality of graphs to find a path in the image that connects the paths mapped by two of the plurality of disconnected graphs.

34. A method according to claim 1, wherein the image represents the heart and a portion of at least one of a ribcage, a liver, a spine, and lungs, and the mask is a mask of blood vessels.

35. A method according to claim 1, wherein said generating further comprises detecting and filtering nodes in the graph according to an orientation of a corresponding junction of vessels in the medical image.

36. Apparatus for analyzing structure of a network of vessels in a medical image, comprising:
an input interface configured for receiving a medical image depicting a network of vessels;
a mask calculating module configured to find a mask of the network of vessels in the image; and
a graph generating module configured to generate a graph mapping a plurality of paths of vessels in the network to directed paths in the graph, with each edge in the graph either directed to indicate a known direction of flow in the corresponding vessel, or undirected to indicate a lack of knowledge of direction of flow in the corresponding vessel, and with all directed edges in a path directed in a same direction as the path;
wherein the graph generating module is configured to allow the graph to have two different paths connecting a same pair of the points, the two different paths constituting an undirected cycle.

37. Apparatus according to claim 36, also comprising a path selecting module configured to select at least one of the paths in the graph according to at least one path property of said path in the graph or of the corresponding path in the image.

38. Apparatus according to claim 37, also comprising a classifying module configured to classify at least one vessel that at least a portion of one of the selected paths goes along.

39. Apparatus according to claim 36, wherein said input interface is configured for receiving said medical image from a picture archiving and communication system (PACS).

40. A method of obtaining a segmentation mask for a medical image, the method comprising:
identifying at least one seed voxel in the medical image; and
expanding each seed voxel to a plurality of neighboring voxels in the medical image, wherein said expanding at each voxel reached is performed according to at least one voxel risk score that changes from one voxel to a next voxel on each path taken by the expansion, the risk score increasing when a local cost function is positive, and decreasing when the local cost function is negative, but not decreasing below a minimum value, the expansion on that path stopping when the risk score reaches a maximum value;
wherein a computer or other device is programmed to carry out the method, and wherein the risk score is a measure of an integral of the local cost encountered by the path taken by the expansion in high enough local cost regions and recently enough so that the risk score stays above the minimum value, but losing memory of any region of high local cost encountered earlier, after it has traversed a sufficiently long region of sufficiently low local cost to bring the risk score down to the minimum value.

* * * * *